US012509590B2

(12) United States Patent
Wilker et al.

(10) Patent No.: US 12,509,590 B2
(45) Date of Patent: Dec. 30, 2025

(54) COMPOSITION OF ANTICORROSION COATINGS AND USES THEREOF

(71) Applicant: Purdue Research Foundation, West Lafayette, IN (US)

(72) Inventors: Jonathan J. Wilker, West Lafayette, IN (US); Alexandre J. Lancelot, West Lafayette, IN (US); Nevin Naren, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 0 days.

(21) Appl. No.: 18/690,732

(22) PCT Filed: Sep. 12, 2022

(86) PCT No.: PCT/US2022/043181
§ 371 (c)(1),
(2) Date: Mar. 10, 2024

(87) PCT Pub. No.: WO2023/039232
PCT Pub. Date: Mar. 16, 2023

(65) Prior Publication Data
US 2024/0400838 A1 Dec. 5, 2024

(51) Int. Cl.
*C09D 5/08* (2006.01)
*C08F 212/08* (2006.01)
*C09D 4/00* (2006.01)
*C09D 7/20* (2018.01)
*C09D 7/63* (2018.01)
*C09D 125/08* (2006.01)

(52) U.S. Cl.
CPC .............. *C09D 5/08* (2013.01); *C08F 212/08* (2013.01); *C09D 4/00* (2013.01); *C09D 7/20* (2018.01); *C09D 7/63* (2018.01); *C09D 125/08* (2013.01); *C08F 2800/20* (2013.01)

(58) Field of Classification Search
CPC ... C09D 5/08; C09D 4/00; C09D 7/20; C09D 7/63; C09D 125/08; C09D 125/18; C08F 212/08; C08F 2800/20; C08K 5/0016
See application file for complete search history.

(56) References Cited

U.S. PATENT DOCUMENTS

| 8,759,465 | B2 * | 6/2014 | Wilker | C08K 5/37 |
| | | | | 525/333.5 |
| 2009/0036611 | A1 | 2/2009 | Wilker et al. | |
| 2018/0274703 | A1 * | 9/2018 | Goto | C08K 3/04 |
| 2019/0322910 | A1 | 10/2019 | Wilker et al. | |

FOREIGN PATENT DOCUMENTS

WO  WO-2021127079 A1 *  6/2021  ............ C08F 212/24

OTHER PUBLICATIONS

Dean McClements, Copolymer: Definition, Properties, Types, and Examples, Xometry (Nov. 30, 2023), https://www.xometry.com/resources/materials/copolymers/. (Year: 2023).*
Cristescu et al., "Thin films of polymer mimics of cross-linking mussel adhesive proteins deposited by matrix assisted pulsed laser evaporation," Applied Surface Science, 2009, 255, 5496-5498. (Year: 2009).*
Room Temperature, Hawley's Condensed Chemical Dictionary 1014 (11th ed. 1987). (Year: 1987).*
Matos-Pérez et al., Polymer Composition and Substrate Influences on the Adhesive Bonding of a Biomimetic, Cross-Linking Polymer, J. Am. Chem. Soc. 2012, 134, 9498-9505. (Year: 2012).*
Jenkins et al., Molecular Weight Effects upon the Adhesive Bonding of a Mussel Mimetic Polymer, ACS Appl. Mater. Interfaces 2013, 5, 5091-5096. (Year: 2013).*
Meredith et al., Enhancing the Adhesion of a Biomimetic Polymer Yields Performance Rivaling Commercial Glues, Adv. Funct. Mater. 2014, 24, 3259-3267. (Year: 2014).*
Cristescu et al., "Thin films of polymer mimics of cross-linking mussel adhesive proteins deposited by matrix assisted pulsed laser evaporation", Applied Surface Science, 2009, 255, 5496-5498, g 5497 para 3-5, p. 5498 para 2.
Ma et al., "Bio-inspired Synthetic Wet Adhesives: from Permanent Bonding to Reversible Regulation", Current Opinion in Colloid & Interface Science, 2020, 47:84-98.

* cited by examiner

*Primary Examiner* — William P Fletcher, III
(74) *Attorney, Agent, or Firm* — David E. Novak; Brannon Sowers & Cracraft PC

(57) ABSTRACT

An anti-corrosion coating comprising a copolymer of 3,4-dihydroxystyrene and styrene and a process for inhibiting corrosion of a metal objection.

19 Claims, 15 Drawing Sheets

FIG. 1

| | |
|---|---|
| ISO Class: 0/ASTM Class: 5B<br>The edges of the cuts are completely smooth; none of the squares of the lattice is detached. | |
| ISO Class: 1/ASTM Class: 4B<br>Detachment of small flakes of the coating at the intersections of the cuts. A cross-cut area not significantly greater than 5% is affected. | |
| ISO Class: 2/ASTM Class: 3B<br>The coating has flaked along the edges and/or at the intersections of the cuts. A cross-cut area significantly greater than 5%, but not significantly greater than 15%, is affected. | |
| ISO Class: 3/ASTM Class: 2B<br>The coating has flaked along the edges of the cuts partly or wholly in large ribbons, and/or it has flaked partly or wholly on different parts of the squares. A cross-cut area significantly greater than 15%, but not significantly greater than 35%, is affected. | |
| ISO Class: 4/ASTM Class: 1B<br>The coating has flaked along the edges of the cuts in large ribbons, and/or some squares have detached partly or wholly. A cross-cut area significantly greater than 35%, but not significantly greater than 65%, is affected. | |
| ISO Class: 5/ASTM Class: 0B<br>Any degree of flaking that cannot even be classified by classification 4. | |

SEM image of an abraded carbon steel surface, uncleaned

SEM image of a rusted carbon steel surface

SEM image of a rusted, abraded carbon steel surface

SEM image of 10% PSC coated and cured on bare carbon steel surface.

SEM image of cured coating from 10% PSC, 4% BEHS on abraded carbon steel surface

COMPOSITION OF ANTICORROSION COATINGS AND USES THEREOF

GOVERNMENT RIGHTS

This invention was made with government support under N00014-2112178 and N00014-1912342, awarded by the Office of Naval Research. The government has certain rights in the invention.

CROSS-REFERENCE TO RELATED APPLICATIONS

This patent application claims the benefit under 35 U.S.C. § 119(e) of U.S. Provisional Patent Application No. 63/243,227, filed on 13 Sep. 2021, the contents of which are hereby incorporated by reference in their entirety into this disclosure.

TECHNICAL FIELD

The present disclosure relates to anti-corrosion coatings comprising biomimetic polymers and their use in inhibiting corrosion of metals.

BACKGROUND

Many consumer, industrial, and military goods are formed from metal substrates and are exposed to the elements. As such, these metal goods are subject to corrosive environments. Corrosion of metals may lead to failure of those goods. Corrosion of metals leads to losses of about $300 billion each year in the United States. (1) For example, the corrosion of steel results in enormous losses in property and industry. It is estimated that a major portion of steel production is consumed in replacing the corroded steel structures every year. There is great demand for methods to prevent corrosion, including new coatings.

Use of a biomimetic adhesive polymer poly(3,4-dihydroxy-styrene-styrene), formula shown below, has been described (see U.S. Pat. No. 11,046,873, the entirety of the contents of which are incorporated herein by reference). This biomimetic system was designed to mimic some aspects of adhesive proteins produced by marine mussels. High strength adhesion has been observed with this system, including in wet environments (2,3).

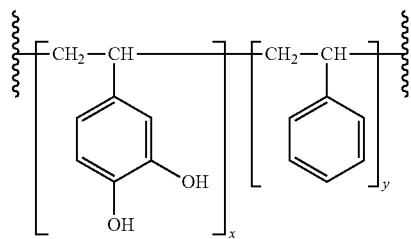

The above formula is meant to convey a random copolymer of about "x" units of 3,4-dihydroxy-styrene with about "y" units of styrene—not a block polymer consisting of a region of poly(3,4-dihydroxy-styrene) and a region of polystyrene. This copolymer is also referred to as poly(catechol-styrene) and PCS.

SUMMARY

It has been discovered that coatings comprising a poly(catechol-styrene) (PCS) adhesive polymer provide surprising protection of metals from corrosion.

The presence of salts and water at the surface of a metal item play a necessary role in the corrosion of that surface and the metal item. The adhesive polymer system described above is hydrophobic in nature. It is believed that the combination of high surface adhesion and high hydrophobicity of the PCS adhesive polymer limits the ability of water and/or salts to contact a metal surface coated with it. When this PCS adhesive polymer is used to make a surface coating, strong binding and hydrophobicity provide potent protection from corrosion (also known as rust).

In one embodiment disclosed herein is a process for inhibiting corrosion of a metal object, the process comprising the steps of contacting the surface of the object with a solution comprising a copolymer of 3,4-dihydroxy styrene and styrene to yield a first coating; and curing the first coating to yield a second coating, where one side of the second coating is adhered to the surface of the object and the other side is exposed to the object's environment; wherein the weight percent (wt %) of 3,4-dihydroxy styrene in the co-polymer is from about 20 wt % to about 35 wt %.

In another embodiment disclosed herein is an anti-corrosion coating for a metal object comprising a copolymer of 3,4-dihydroxy styrene and styrene, wherein the weight percent (wt %) of 3,4-dihydroxy styrene in the co-polymer is from about 20 wt % to about 35 wt %.

BRIEF DESCRIPTION OF THE DRAWINGS

FIG. 1 Description of the ISO rating used in the cross-hatch test.

DETAILED DESCRIPTION

Figure 2:
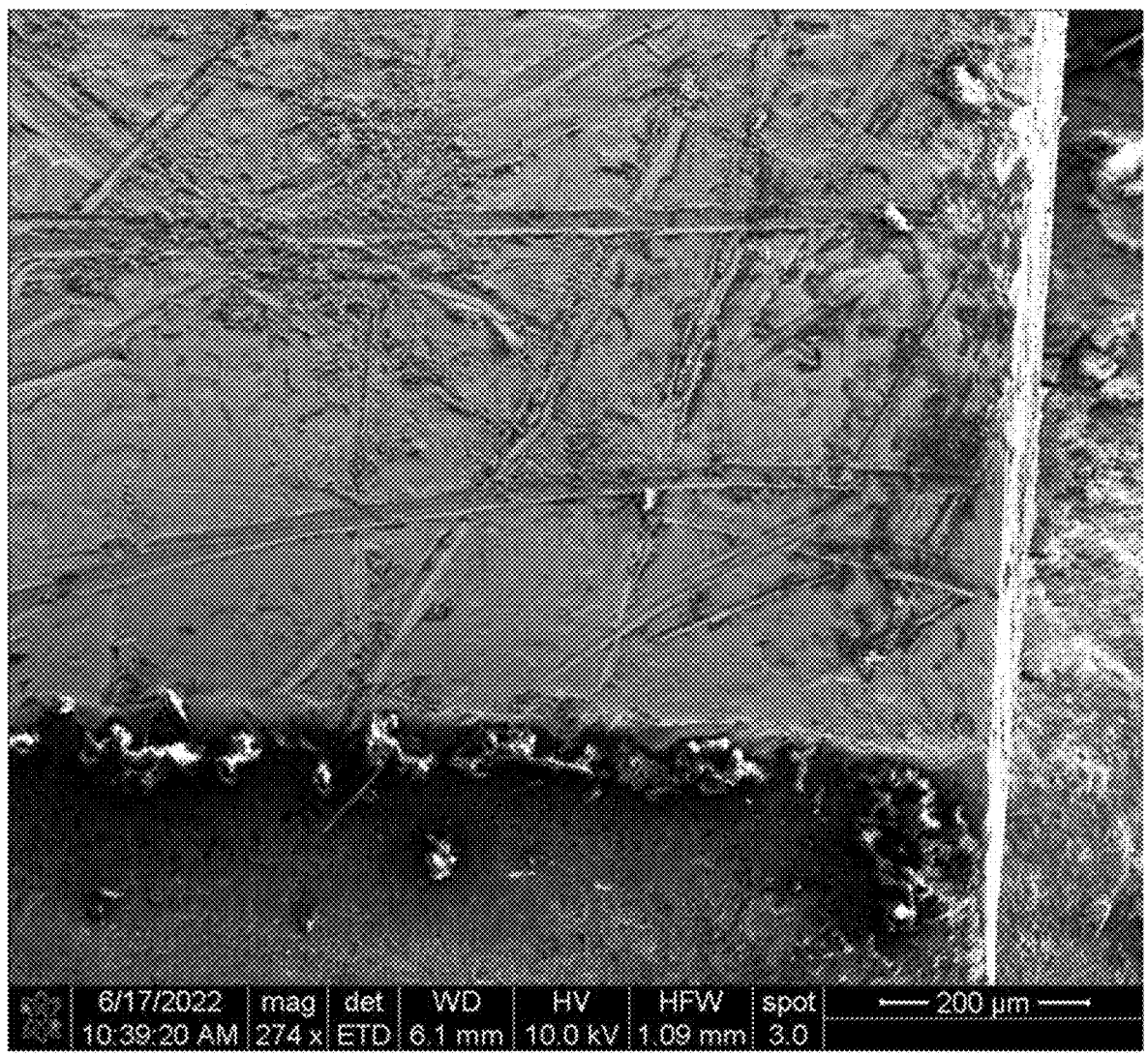
FIG. 2 A scanning electron microscope (SEM) image of an abraded steel surface at 274× magnification FIG. 3a A SEM image of a rusted steel surface at 573× magnification.
Figure 3A:
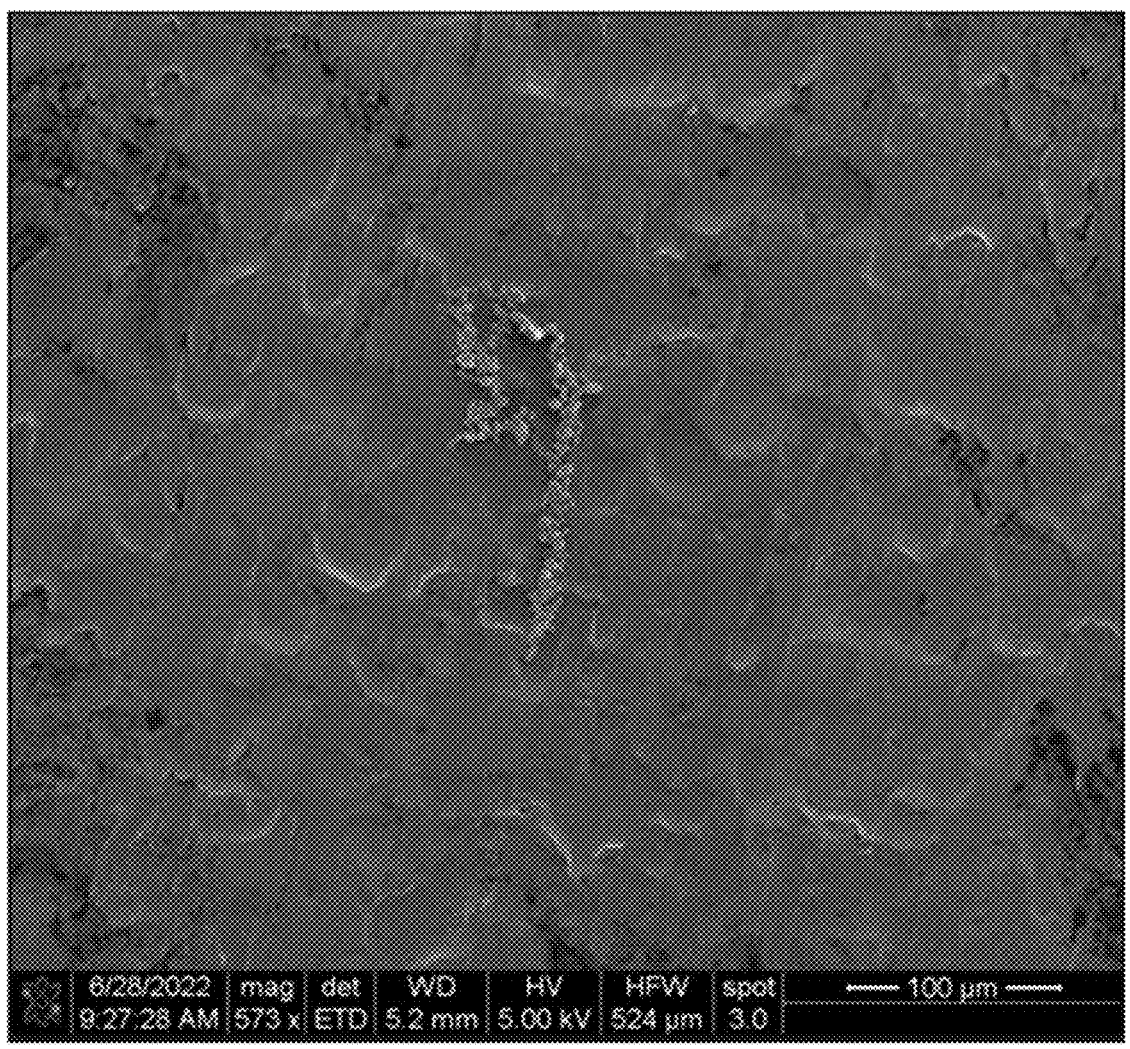
FIG. 3b A SEM image of a rusted steel surface at 1,392× magnification.
FIG. 3c A SEM image of a rusted steel surface at 11,633× magnification.
Figure 3B:
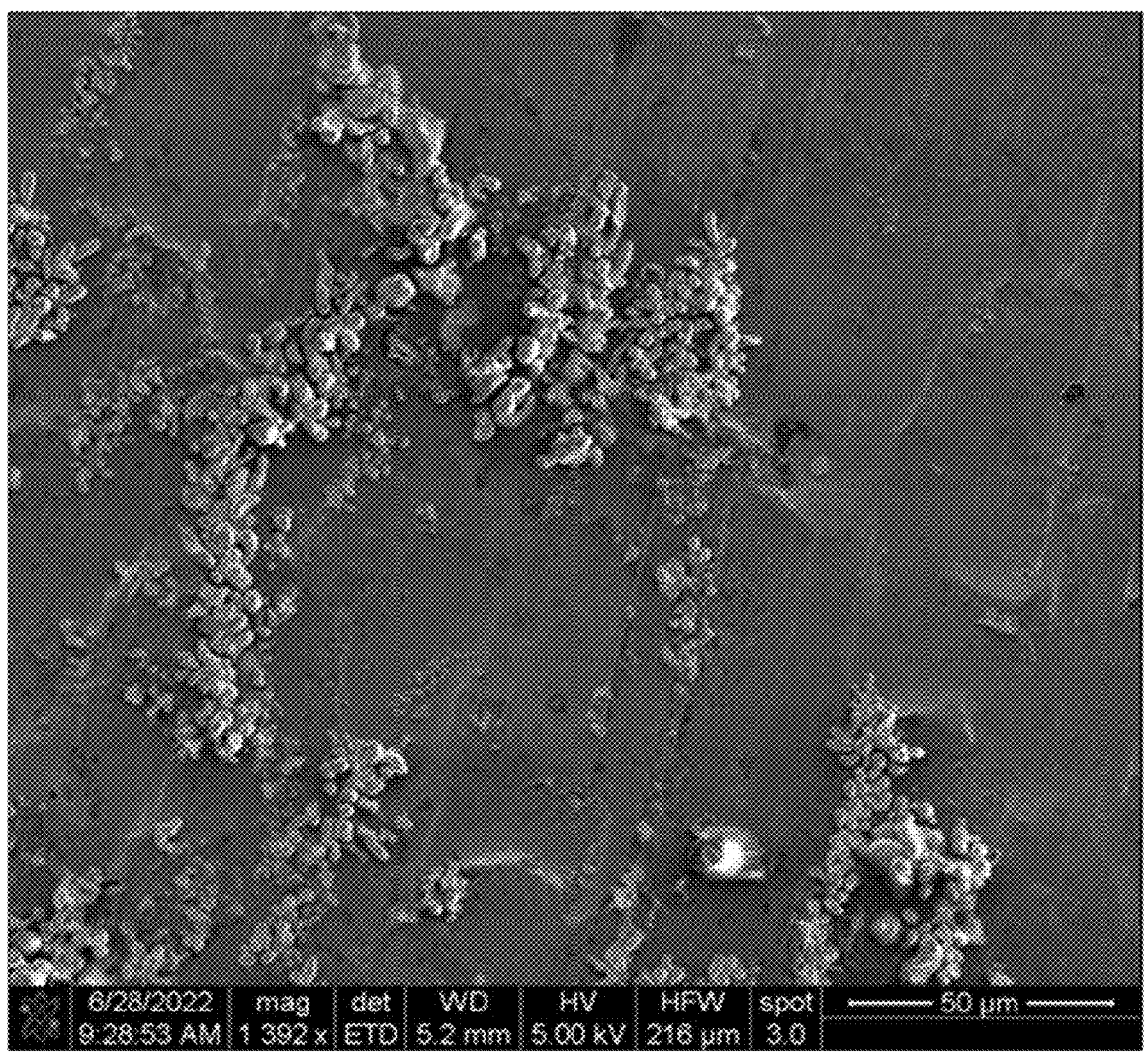
Figure 3C:
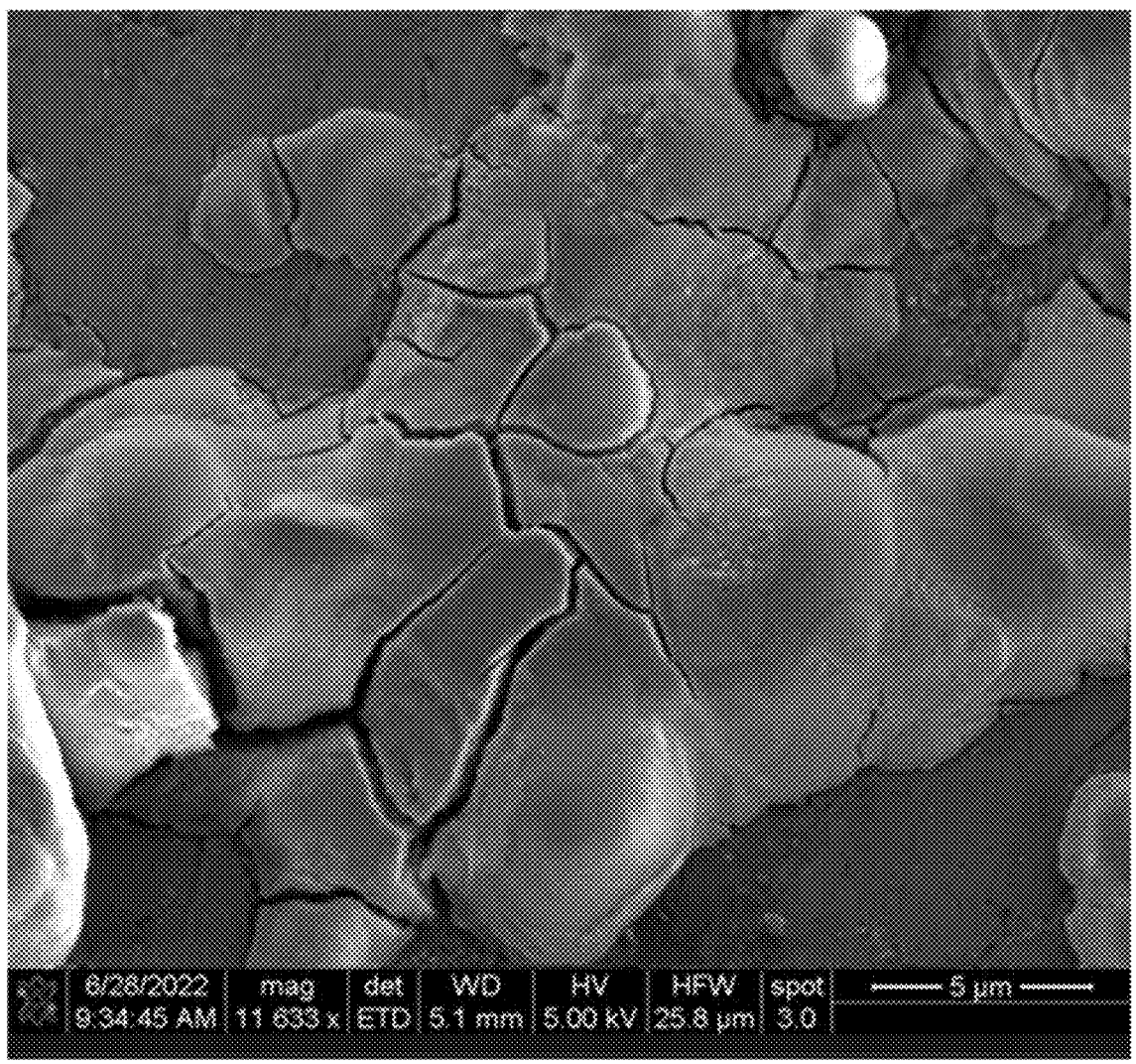
Figure 4A:
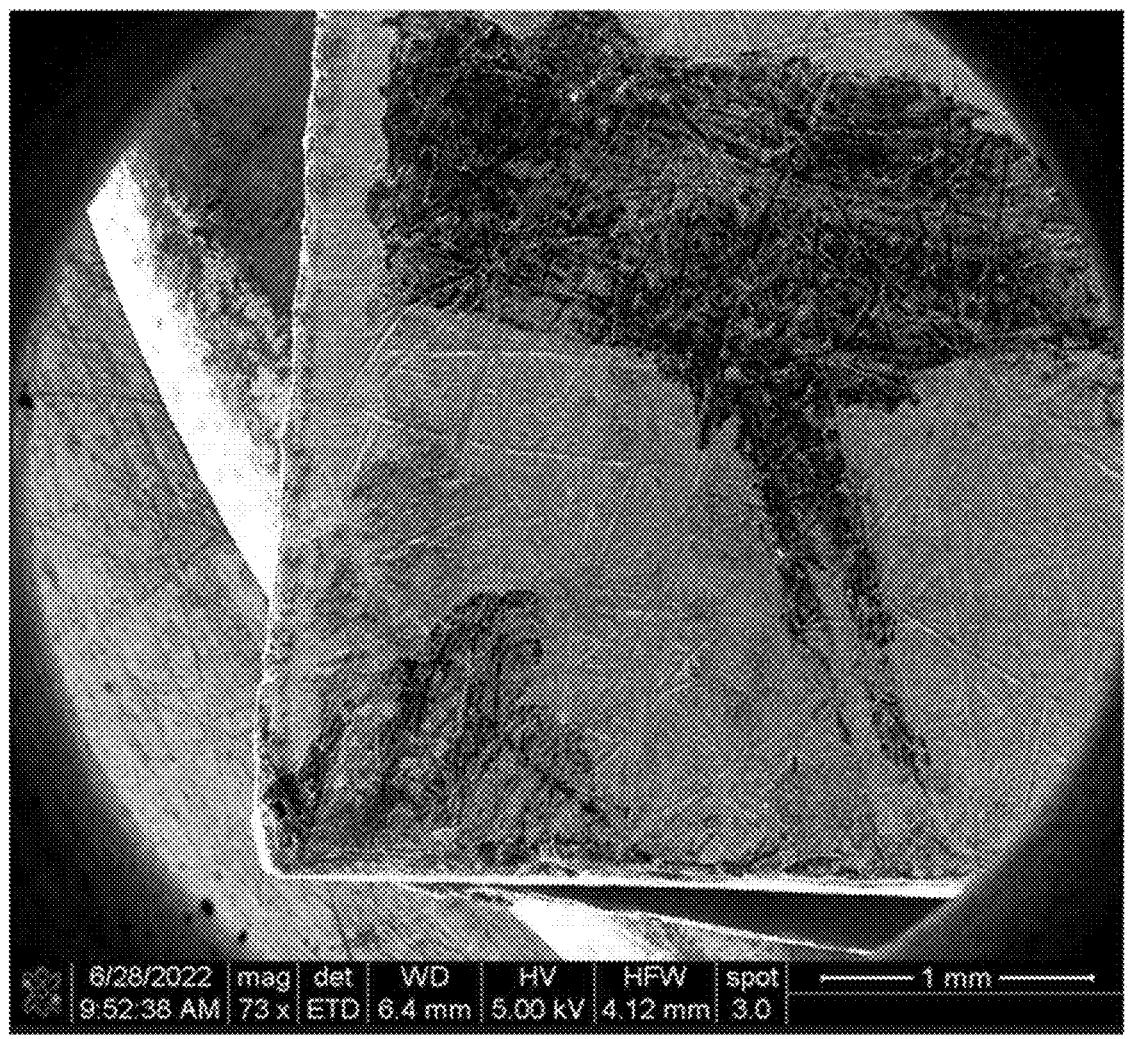
FIG. 4a A SEM image of a rusted steel surface at 72× magnification.
Figure 4B:
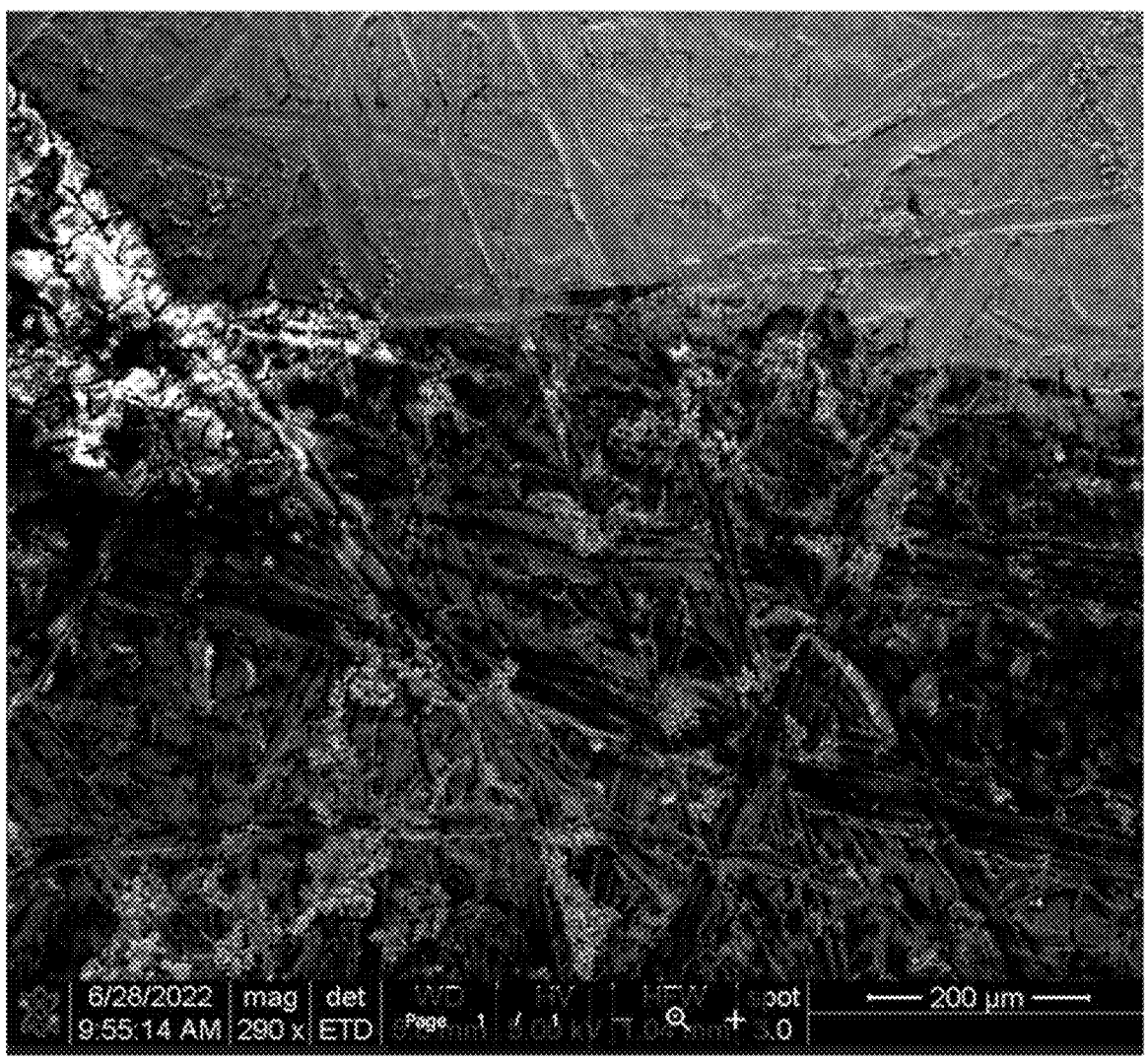
FIG. 4b A SEM image of a rusted steel surface at 290× magnification.
Figure 5A:
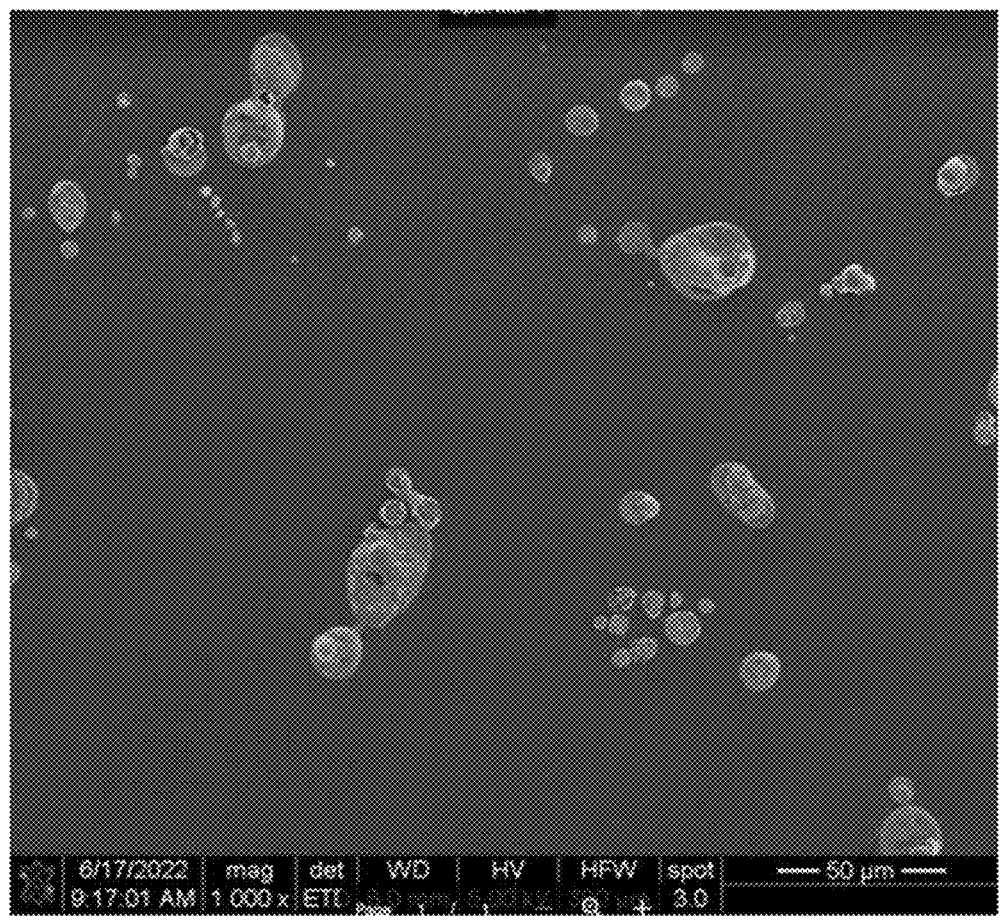
FIG. 5a A SEM image of 10% poly(catechol-styrene) (PSC) coated and cured on a bare carbon steel surface at 1,000× magnification.
Figure 5B:
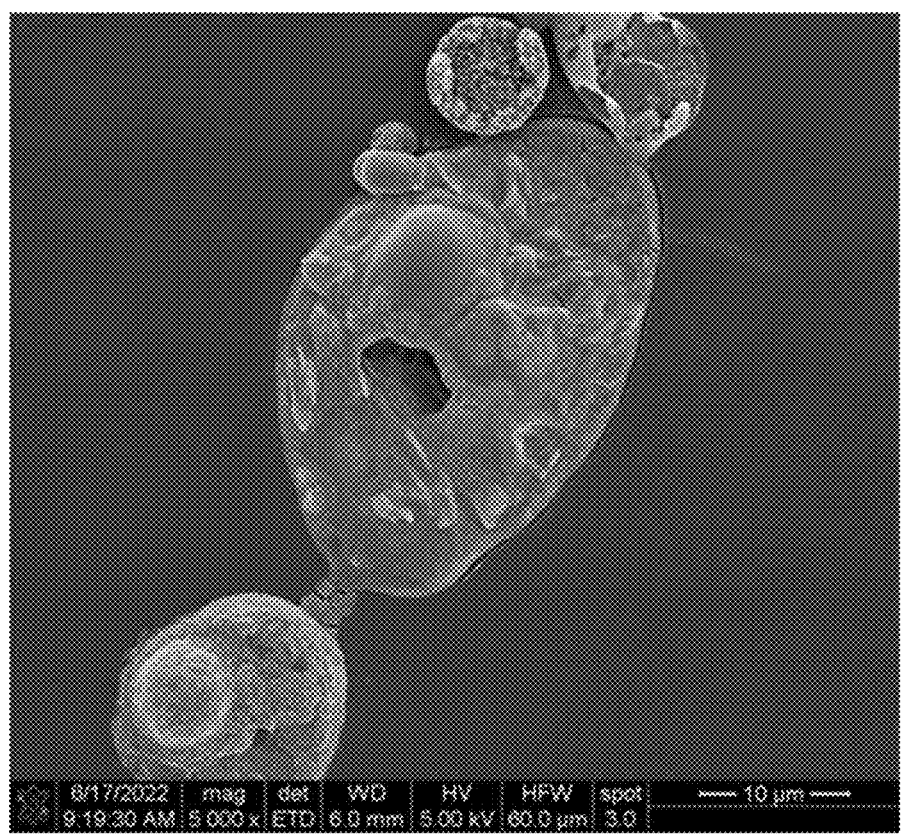
FIG. 5b A SEM image of 10% PSC coated and cured on a bare carbon steel surface at 5,000× magnification.
Figure 5C:
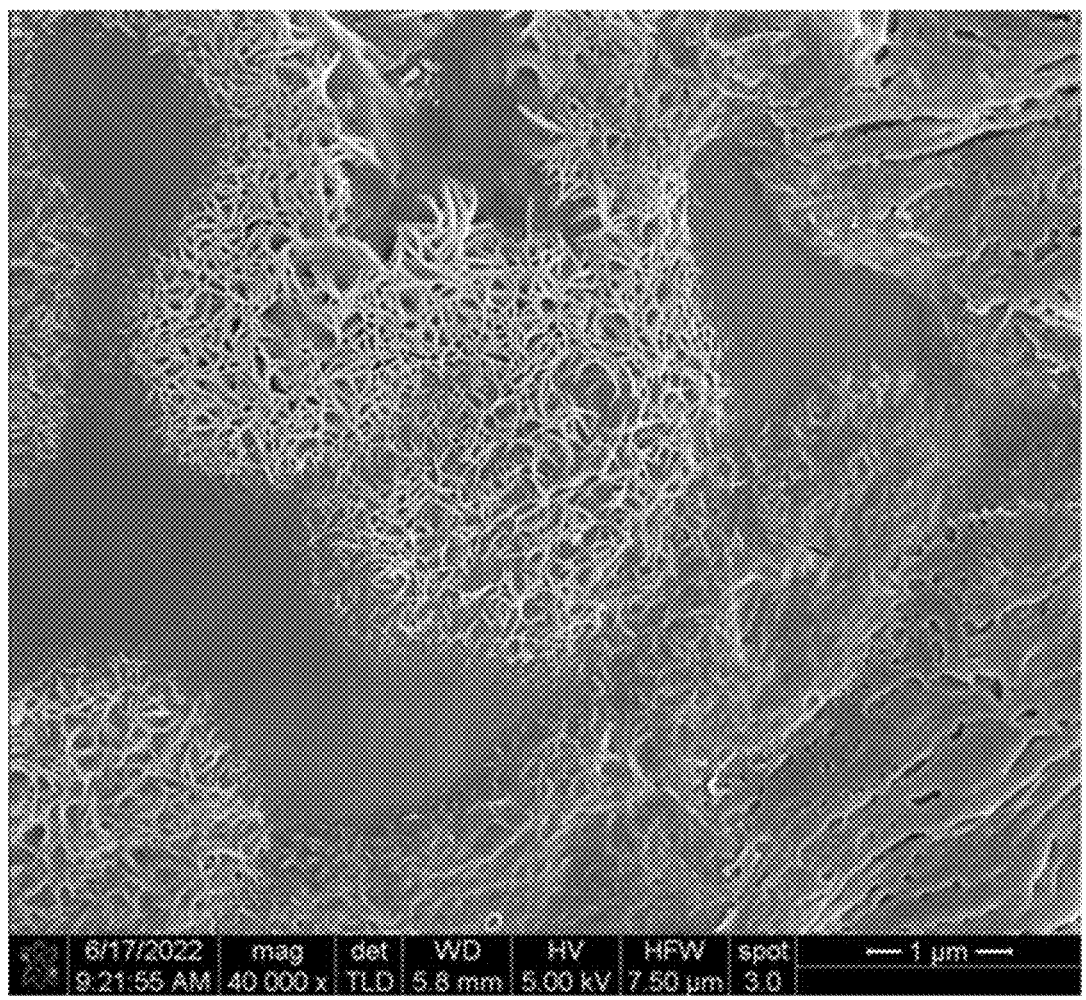
FIG. 5c A SEM image of 10% PSC coated and cured on a bare carbon steel surface at 40,000× magnification.
Figure 5D:
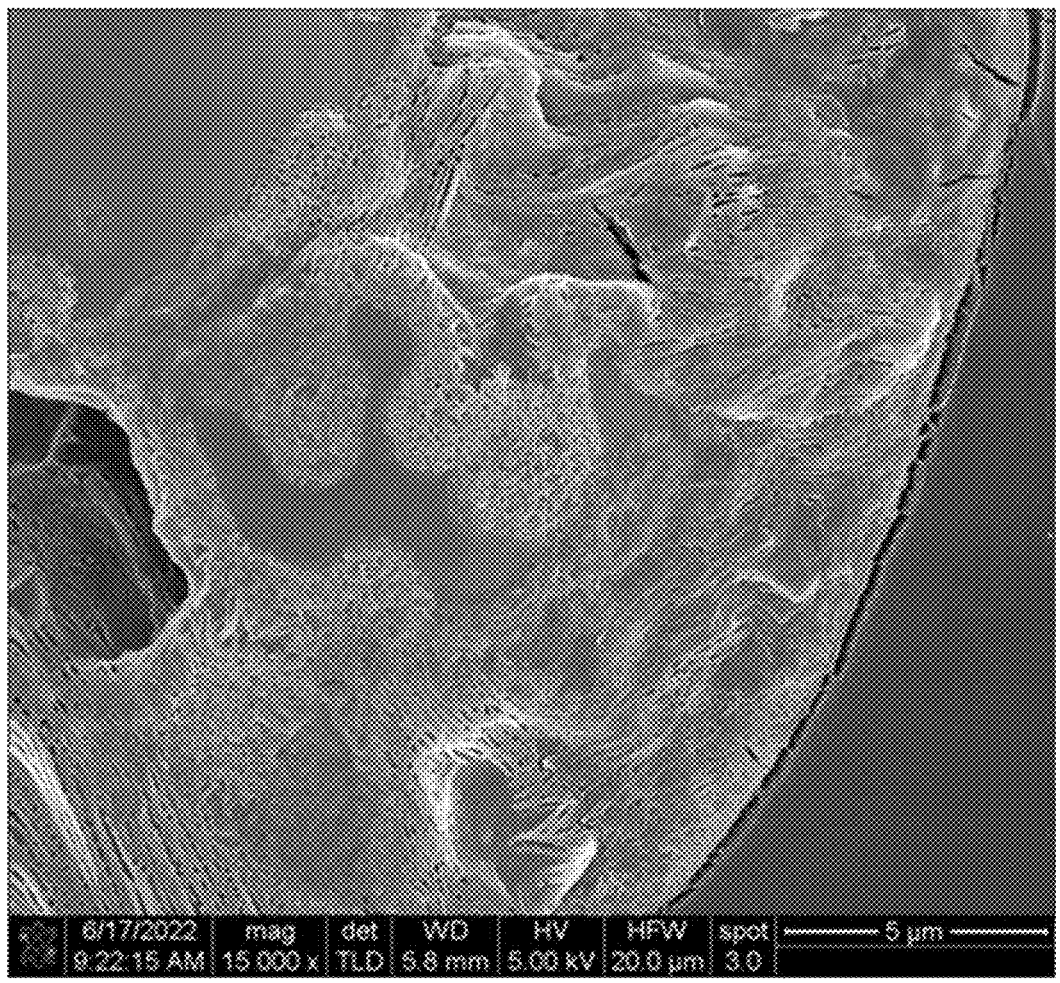
FIG. 5d A SEM image of 10% PSC coated and cured on a bare carbon steel surface at 15,000× magnification.
Figure 6A:
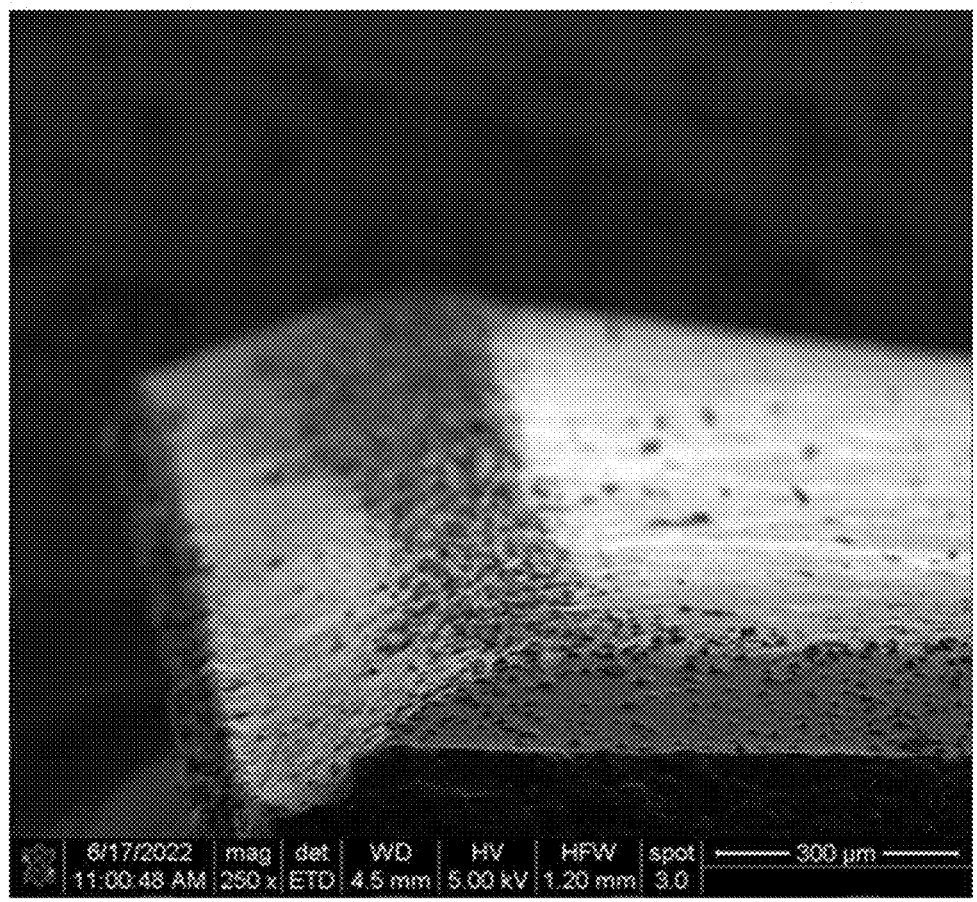
FIG. 6a A SEM image of a cured coating from 10% PSC and 4% bis (2-ethylhexyl) sebacate (BEHS) on an abraded carbon steel surface at 250× magnification.
Figure 6B:
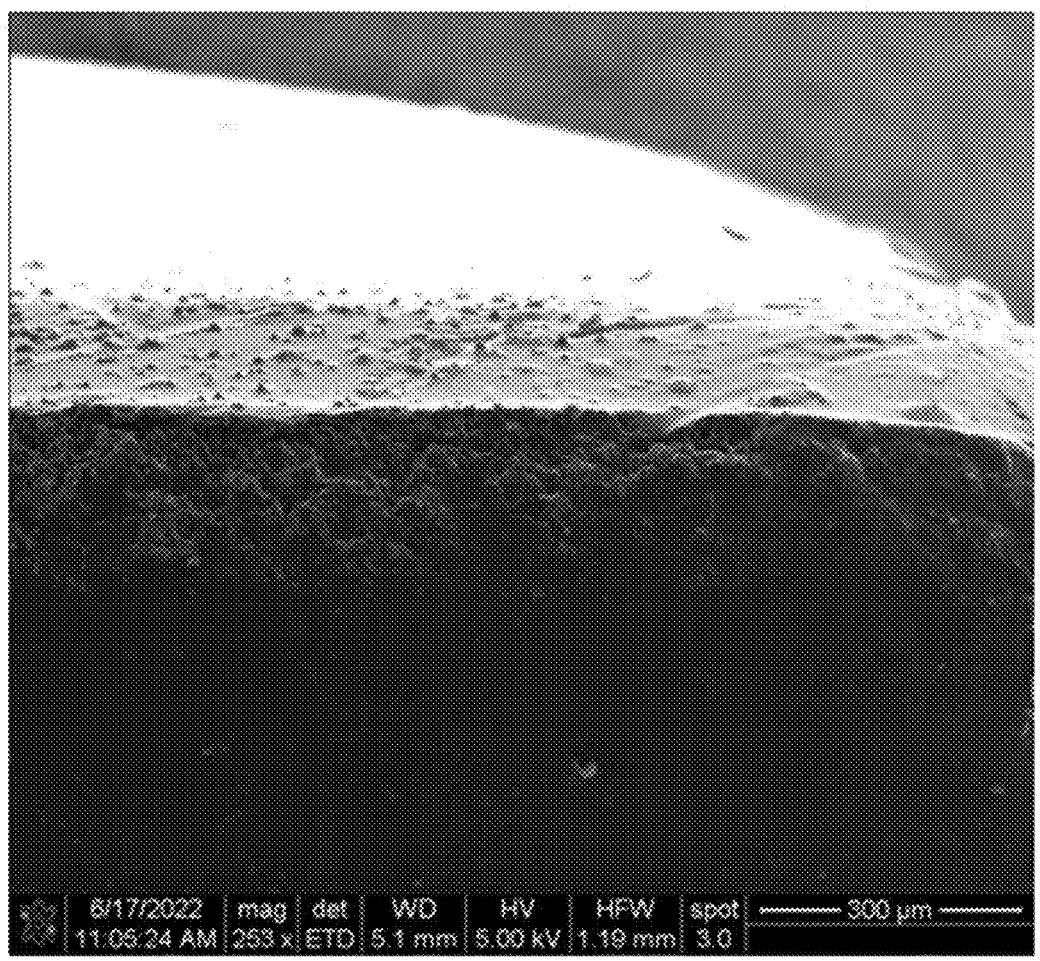
FIG. 6b A SEM image of a cured coating from 10% PSC and 4% BEHS on an abraded carbon steel surface at 253× magnification.
Figure 6C:
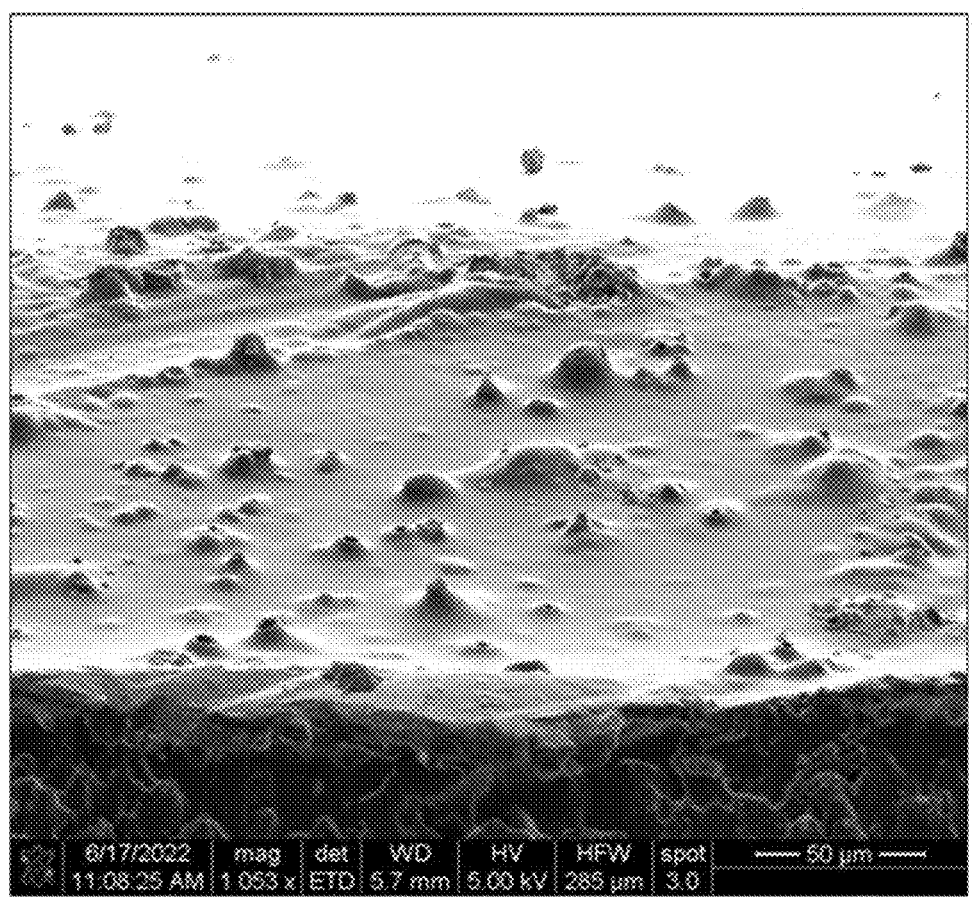
FIG. 6c A SEM image of a cured coating from 10% PSC and 4% BEHS on an abraded carbon steel surface at 1,053× magnification.
Figure 6D:
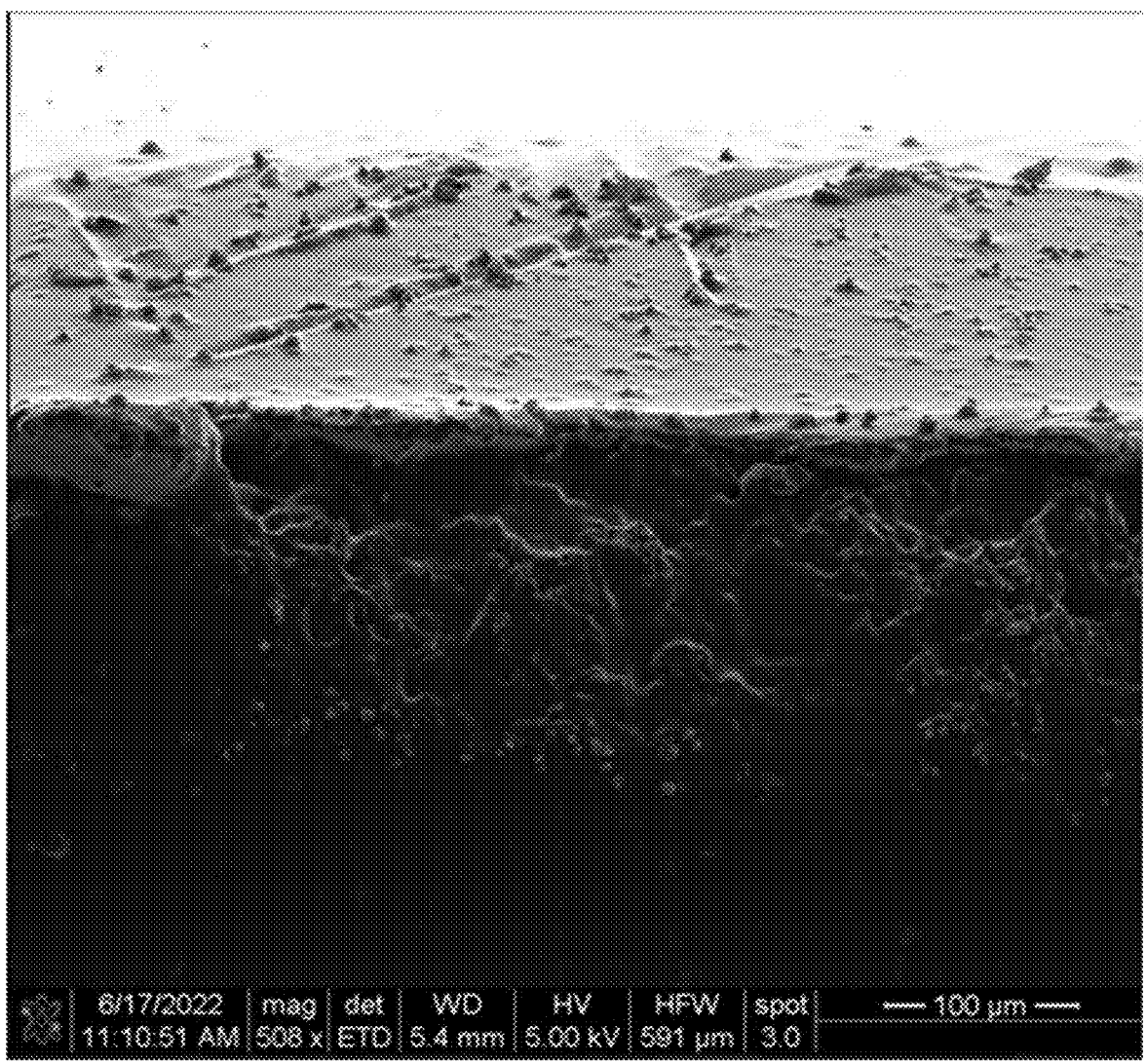
FIG. 6d A SEM image of a cured coating from 10% PSC and 4% BEHS on an abraded carbon steel surface at 580× magnification.

The following detailed description is merely exemplary in nature and is not intended to limit the exemplary embodiments or the application and uses thereof. Furthermore, there is no intention to be bound by any theory presented in the preceding background or the following detailed description.

The features and advantages of the present invention will be more readily understood, by those of ordinary skill in the art, from reading the following detailed description. It is to be appreciated that certain features of the invention, which are, for clarity, described above and below in the context of separate embodiments, may also be provided in combination in a single embodiment. Conversely, various features of the invention that are, for brevity, described in the context of a single embodiment, may also be provided separately or in any sub-combination. In addition, references in the singular may also include the plural (for example, "a" and "an" may refer to one, or one or more) unless the context specifically states otherwise.

The use of numerical values in the various ranges specified in this application, unless expressly indicated otherwise, are stated as approximations as though the minimum and maximum values within the stated ranges were both proceeded by the word "about." In this manner, slight variations above and below the stated ranges can be used to achieve substantially the same results as values within the ranges. Also, the disclosure of these ranges is intended as a continuous range including every value between the minimum and maximum values.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended. Any alterations and further modifications of the described or illustrated embodiments, and any further applications of the principles of the invention as illustrated herein are contemplated as would normally occur to one skilled in the art to which the invention relates.

In one embodiment there is disclosed a process for inhibiting the corrosion of a metal object, the process comprising the steps of contacting the surface of the object with a solution comprising a copolymer of 3,4-dihydroxy styrene and styrene to yield a first coated surface and curing the first coated surface.

In another embodiment there is disclosed an anti-corrosion coating for a metal comprising a copolymer of 3,4-dihydroxy styrene and styrene.

Several illustrative and non-limiting embodiments of the disclosure are described by the following clauses:

A process for inhibiting corrosion of a metal object, the process comprising the steps of contacting the surface of the object with a solution comprising a copolymer of 3,4-dihydroxy styrene and styrene to yield a first coating; and curing the first coating to yield a second coating, where one side of the second coating is adhered to the surface of the object and the other side of the second coating is exposed to the object's environment; wherein the weight percent (wt %) of 3,4-dihydroxy styrene in the co-polymer is from about 20 wt % to about 35 wt % (such as 20 wt % to about 35 wt % or about 20 wt % to 35 wt %).

The process of the preceding clause or any one of the following process clauses, wherein the wt % of 3,4-dihydroxy styrene in the co-polymer is from about 20 wt % to about 30 wt % (such as 20 wt % to about 30 wt % or about 20 wt % to 30 wt %).

The process of any one of the preceding or following process clauses, wherein the wt % of 3,4-dihydroxy styrene in the co-polymer is from about 24 wt % to about 26 wt % (such as 24 wt % to about 26 wt % or about 24 wt % to 26 wt %).

The process of any one of the preceding or following process clauses, wherein the solution comprises one or more solvents selected from the group consisting of acetone, 2-butanone, tetrahydrofuran (THF), 2-methyl-tetrahydrofuran (2-Me-THF), dimethyl carbonate (DMC), ethyl lactate, ethyl acetate, n-butyl acetate, and propylene carbonate (PC) The process of any one of the preceding or following process clauses, wherein the solution further comprises a plasticizer, wherein the wt % of the plasticizer relative to the copolymer is from about 1 wt % to about 20 wt % (such as 1 wt % to about 20 wt % or about 1 wt % to 20 wt %).

The process of any one of the preceding or following process clauses, wherein the plasticizer is selected from the group consisting of di-alkylphthalates, tri-alkyl-O-acyl citrates, and di-alkylsebacates.

The process of any one of the preceding or following process clauses, wherein the plasticizer is di-n-octyl phthalate or bis(2-ethylhexyl) sebacate.

The process of any one of the preceding or following process clauses, wherein the plasticizer is about 2.5 wt % bis(2-ethylhexyl) sebacate.

The process of any one of the preceding or following process clauses, wherein the plasticizer is about 5.0 wt % of di-n-octyl phthalate.

The process of any one of the preceding or following process clauses, wherein the solution further comprises a plasticizer, wherein the wt % of the plasticizer is from about 1 wt % to about 20 wt % (such as 1 wt % to about 20 wt % or about 1 wt % to 20 wt %).

The process of any one of the preceding or following process clauses, wherein the plasticizer is di-n-octyl phthalate or bis(2-ethylhexyl) sebacate.

The process of any one of the preceding or following process clauses, wherein the plasticizer is about 2.5 wt % bis(2-ethylhexyl) sebacate.

The process of any one of the preceding or following process clauses, wherein the plasticizer is about 5.0 wt % of di-n-octyl phthalate.

The process of any one of the preceding or following process clauses, wherein the second coating has one or more of the following characteristics:
  (a) a thickness from about 0.5 mil to about 3.5 mil (such as 0.5 mil to about 3.5 mil or about 0.5 mil to 3.5 mil);
  (b) a pencil hardness of greater than 5H; and
  (c) a cross-hatch test value of ISO 0.

The process of any one of the preceding or following process clauses, wherein the object has less than about 5% corrosion after being immersed in a 3.9% saltwater solution for 24 hours.

The process of any one of the preceding or following process clauses, wherein the metal is selected from the group consisting of iron, steel, aluminum, zinc, bronze, brass, titanium, magnesium, tin, cobalt, tungsten, nickel, and copper.

The process of any one of the preceding clauses, wherein the metal is steel.

An anti-corrosion coating for a metal object comprising a copolymer of 3,4-dihydroxy styrene and styrene, wherein the wt % of 3,4-dihydroxy styrene in the co-polymer is from about 20 wt % to about 35 wt %. (such as 20 wt % to about 35 wt % or about 20 wt % to 35 wt %)

The anti-corrosion coating of the preceding or any one of the following anti-corrosion coating clauses, wherein the wt % of 3,4-dihydroxy styrene in the co-polymer is from about 20 wt % to about 30 wt % (such as 20 wt % to about 30 wt % or about 20 wt % to 30 wt %).

The anti-corrosion coating of any one of the preceding or following anti-corrosion coating clauses, wherein the wt % of 3,4-dihydroxy styrene in the co-polymer is from about 24 wt % to about 26 wt % (such as 24 wt % to about 26 wt % or about 24 wt % to 26 wt %).

The anti-corrosion coating of any one of the preceding or following anti-corrosion coating clauses, further comprising a plasticizer, wherein the wt % of the plasticizer relative to the copolymer is from about 1 wt % to about 20 wt % (such as 1 wt % to about 20 wt % or about 1 wt % to 20 wt %)

The anti-corrosion coating of any one of the preceding or following anti-corrosion coating clauses wherein the plasticizer is selected from the group consisting of di-alkylphthalates, tri-alkyl-O-acyl citrates, and di-alkylsebacates.

The anti-corrosion coating of any one of the preceding or following anti-corrosion coating clauses, wherein the plasticizer is di-n-octyl phthalate or bis(2-ethylhexyl) sebacate.

The anti-corrosion coating of any one of the preceding or following anti-corrosion coating clauses, wherein the plasticizer is about 2.5 wt % bis(2-ethylhexyl) sebacate.

The anti-corrosion coating of any one of the preceding or following anti-corrosion coating clauses, wherein the plasticizer is about 5.0 wt % di-n-octyl phthalate.

The anti-corrosion coating of any one of the preceding or following anti-corrosion coating clauses, wherein the anti-corrosion coating has one or more of the following characteristics:
   (a) a thickness from about 0.5 mil to about 3.5 mil (such as 0.5 mil to about 3.5 mil or about 0.5 mil to 3.5 mil);
   (b) a pencil hardness of greater than 5H; and
   (c) a cross-hatch test value of ISO 0.

The anti-corrosion coating of any one of the preceding or following anti-corrosion coating clauses, wherein the object has less than about 5% corrosion after being immersed in a 3.9% saltwater solution for 24 hours.

The anti-corrosion coating of any one of the preceding or following anti-corrosion coating clauses, wherein the metal is selected from the group consisting of iron, steel, aluminum, zinc, bronze, brass, titanium, magnesium, tin, cobalt, tungsten, nickel, and copper.

The anti-corrosion coating of any one of the preceding anti-corrosion coating clauses, wherein the metal is steel.

The term "about" can allow for a degree of variability in a value or range, for example, within 10%, within 5%, or within 1% of a stated value or of a stated limit of a range. The term "substantially" can allow for a degree of variability in a value or range, for example, within 80%, within 90%, within 95%, or within 99% of a stated value or of a stated limit of a range.

Specific quantities (spatial dimensions, pressures, momenta, dimensionless parameters, etc.) may be used explicitly or implicitly. Such specific quantities are presented as examples and are approximate values unless otherwise indicated. Discussions pertaining to specific compositions of matter are presented as examples and do not limit the applicability of other compositions of matter, especially other compositions of matter with similar properties, unless otherwise indicated.

As used herein, corrosion, surface corrosion, and rust are used interchangeably to describe corrosion of a metallic surface. Inhibition of corrosion generally means prevention of corrosion or limiting corrosion to an acceptable amount. An acceptable amount of corrosion may be less than about 1%, less than about 2%, less than about 3%, less than about 4%, less than about 5%, less than about 6%, less than about 7%, less than about 8%, less than about 9%, or less than about 10%. It is understood that that the amount of corrosion may be estimated visually or measured by standard means known to those skilled in the art.

It is understood that applying the corrosion inhibiting coatings described herein can be accomplished by any method consistent with the properties of the coating material known in the art. In one embodiment, this involves dissolving the coating material in a solvent to make a solution and applying the solution to the surface to be protected. The solution may be applied to the surface to be protected by dipping the surface in the solution, spraying the surface with the solution, brushing the solution onto the surface, or using any coating apparatus known to those skilled in the art.

The term "curing" generally refers to removing the solvent from the coating at a temperature from about room temperature to about 150° C. (such as about room temperature to 150° C. or room temperature to about 150° C.) for a period of time from about 1 hour to about 24 hours (such as about 1 hour to 24 hours or 1 hour to about 24 hours).

The experiments described below, describe the potential for poly(catechol-styrene) to provide anticorrosion properties. Coatings of the polymer on steel test strips inhibited corrosion after the metal substrates were submerged into salt water. Control steel test strips that were either uncoated or coated with simple polystyrene corroded rapidly. This new system provides a substantial advance in minimizing the vast damage caused by corrosion of metals.

EXAMPLES

Materials

Carbon Steel Sheets (24×24×0.03 inches) were purchased from McMaster-Carr and cut in-house to strips of (4×1×0.03 inches) or (2×1×0.03 inches). The surfaces of the strips were cleaned by dipping in hexanes, followed by drying on absorbent paper, and wiping off with acetone and drying.

General Procedure 1

Poly(styrene-catechol) (76% styrene, 24% vinyl catechol, Mw=233.6 kg/mol, D=4.21) was dissolved in acetone to yield a 0.1 gram/mL solution (Solution A). Poly(styrene-catechol) (76% styrene, 24% vinyl catechol, Mw=233.6 kg/mol, D=4.21) was dissolved in dimethyl carbonate (DMC) to yield a 0.1 gram/mL solution (Solution B).

Corrosion Trial 1

Three (4×1×0.03 inches) carbon-steel strips were wetted with 1 mL of fresh solution A using a Pasteur pipette, and the solution was spread over the metal surface. The coated metal strips were then placed in an oven at 75° C. for 1 hour and were cooled to room temperature for 15 minutes. The coated metal strips were placed in a 3.9% saltwater solution for 24 hours. Following their removal from the saltwater solution, they were left to dry for 30 minutes before being observed. The control strip (no polymer coating) showed 100% surface corrosion. The treated strips showed about 80% surface corrosion.

The poly(styrene-catechol) had turned brown and delaminated quite readily from the surface of the steel. On the steel itself were observed corrosion in the form of rust, minor facial pitting, lateral deterioration from the edges (likely due to higher surface energy relative to the face of the strip). However, compared to the untreated carbon-steel control, there was a slight improved resistance to corrosion.

Corrosion Trial 2A: T-Bar Coating Applicator

Three (4×1×0.03 inches) carbon-steel strips were wetted with 1 mL of fresh solution A using a Pasteur pipette, and the solution was spread all over the metal surface using an 18 inch lightweight T-Bar coating applicator (purchased from Bon Tool). The coated metal strips were then placed in an oven at 75° C. for 1 hour and were cooled to room temperature for 15 minutes. The coated metal strips were placed in a 3.9% saltwater solution for 25 hours. Following their removal from the saltwater solution, they were left to dry for 30 minutes before being observed. The control strip was uncoated. On the steel itself were observed corrosion in the form of rust, lateral deterioration from the edges (likely due to higher surface energy relative to the face of the strip), and significant corrosion banding along the surface, extending from one edge to the other (perhaps due to the poor wetting nature of acetone on steel). However, compared to the untreated carbon-steel control, there was significantly improved resistance to corrosion. The treated strips showed 25%, 35%, and 20% corrosion, respectively.

Corrosion Trial 2B

Three (4×1×0.03 inches) carbon-steel strips were wetted with 1 mL of fresh solution B using a Pasteur pipette, and the solution was spread all over the metal surface using an 18 inch lightweight T-Bar coating applicator (purchased from Bon Tool). The coated metal strips were then placed in an oven at 120° C. for 1 hour and were cooled to room temperature for 15 minutes. The coated metal strips were placed in a 3.9% saltwater solution for 24 hours. Following their removal from the saltwater solution, they were left to dry for 30 minutes before being observed. On the steel itself were observed corrosion in the form of rust, lateral deterioration from the edges, and minor corrosion banding along the surface, extending from one edge to the other. There was less banding in this case due to the use of DMC in place of acetone (it was observed that acetone solutions generally provided less efficient wetting of the steel surface than DMC. However, compared to the untreated carbon-steel control, there was a greater improvement in resistance to corrosion. The control strip showed 100% surface corrosion. The treated strips showed 20%, 15%, and 10% surface corrosion, respectively.

Corrosion Trial 3A: Draw Bar Coating

Three (4×1×0.03 inches) carbon-steel strips were wetted with 1 mL of fresh solution A using a Pasteur pipette, and the solution was spread all over the metal surface using a stainless steel draw bar film applicator of 250 um (purchased from SZQ). The coated metal strips were then placed in an oven at 75° C. for 1 hour and were cooled to room temperature for 15 minutes. The coated metal strips were placed in a 3.9% saltwater solution for 24 hours. Following their removal from the saltwater solution, they were left to dry for 30 minutes before being observed. The strips showed corrosion in the form of rust, lateral deterioration from the edges, and significant corrosion banding along the surface, extending from one edge to the other (perhaps due to the poor wetting nature of acetone on steel). The control strip showed 100% surface corrosion, the treated strips showed 20%, 15%, and 10% surface corrosion.

Corrosion Trial 3B

Three (4×1×0.03 inches) carbon-steel strips were wetted with 1 mL of fresh solution B using a Pasteur pipette, and the solution was spread all over the metal surface using a stainless steel draw bar film applicator of 250 um (purchased from SZQ). The coated metal strips were then placed in an oven at 120° C. for 1 hour and were cooled to room temperature for 15 minutes. The coated metal strips were placed in a 3.9% saltwater solution for 24 hours. Following their removal from the saltwater solution, they were left to dry for 30 minutes before being observed. On the steel itself were observed corrosion in the form of rust, severe lateral deterioration from the edges, and almost no corrosion banding along the surface. The treated strips showed 10%, 15%, and 15% corrosion respectively.

Corrosion Trial 4

The same procedures shown above were used to compare treatments of the steel strips with solutions of poly(styrene-catechol) in acetone or DMC and solutions of poly(styrene) in acetone or DMC. It was noted that poly(styrene) showed poorer solubility in acetone compared to its solubility in DMC. For these tests polystyrene (Mw=83.7 kg/mol, Đ=2.13), was dissolved in acetone to yield a 0.1 gram/mL solution (Solution C), or in DMC to yield a 0.1 g/mL solution (Solution D).

In each instance the untreated control strips showed 100% surface corrosion. Strips treated with solution A and processed as above showed 25%, 30%, and 20% corrosion. Strips treated with solution C and processed as above showed 85%, 95%, and 90% corrosion. Strips treated with solution B and processed as above showed 20%, 15%, and 10% corrosion. Strips treated with solution D and processed as above showed 80%, 80%, and 90% corrosion.

Corrosion Trial 6A: Double Coat, T-Bar

Three (4×1×0.03 inches) carbon-steel strips were wetted with 1 mL of fresh solution A using a Pasteur pipette, and the solution was spread all over the metal surface using an 18-inch lightweight T-Bar coating applicator (purchased from Bon Tool). The coated metal strips were then placed in an oven at 75° C. for 30 minutes and were cooled to room temperature for 15 minutes. On the same carbon steel strips was added 1 mL of fresh solution A using a Pasteur pipette, and the solution was spread all over the metal surface using an 18-inch lightweight T-Bar coating applicator (purchased from Bon Tool) for a second time. The coated metal strips were then placed in an oven at 75° C. for 30 minutes and were cooled to room temperature for 15 minutes. The coated metal strips were placed in a 3.9% saltwater solution for 25 hours. Following their removal from the saltwater solution, they were left to dry for 30 minutes before being observed. The control strip showed 100% surface corrosion. Each of the treated strips showed less than 5% corrosion.

Corrosion Trial 6B: Double Coat, T-Bar

Three (4×1×0.03 inches) carbon-steel strips were wetted with 1 mL of fresh solution B using a Pasteur pipette, and the solution was spread all over the metal surface using an 18-inch lightweight T-Bar coating applicator (purchased from Bon Tool). The coated metal strips were then placed in an oven at 120° C. for 30 minutes and were cooled to room temperature for 15 minutes. On the same carbon steel strips was added 1 mL of fresh solution B using a Pasteur pipette, and the solution was spread all over the metal surface using an 18-inch lightweight T-Bar coating applicator (purchased from Bon Tool) for a second time. The coated metal strips were then placed in an oven at 120° C. for 30 minutes and were cooled to room temperature for 15 minutes. The coated metal strips were placed in a 3.9% saltwater solution for 25 hours. Following their removal from the saltwater solution, they were left to dry for 30 minutes before being observed.

The untreated strip showed 100% surface corrosion. The treated strips each showed less than 5% surface corrosion.

Corrosion Trial 8A

Three (4×1×0.03 inches) carbon-steel strips were wetted with 1 mL of fresh solution A using a Pasteur pipette, and the solution was spread all over the metal surface using an 18-inch lightweight T-Bar coating applicator (purchased from Bon Tool). The coated metal strips were then placed in an oven at 75° C. for 30 minutes and were cooled to room temperature for 15 minutes. On the same carbon steel strips was added 1 mL of fresh solution A using a Pasteur pipette, and the solution was spread all over the metal surface using an 18-inch lightweight T-Bar coating applicator (purchased from Bon Tool) for a second time. The coated metal strips were then placed in an oven at 75° C. for 30 minutes and were cooled to room temperature for 15 minutes. Then, using an Rainin automatic pipette, 400 µL of fresh solution A was applied to the edges of the strips, and the strips were placed in an oven at 75° C. for 40 minutes and were cooled to room temperature for 15 minutes. The coated metal strips were placed in a 3.9% saltwater solution for 10 days. Following their removal from the saltwater solution, they were left to dry for 30 minutes before being observed. The control strip showed 100% surface corrosion. The treated strip showed less than 5% surface corrosion at 24, 48, and 72 hours. After 72 hours, on the steel itself, were observed no corrosion in the form of rust and almost no lateral deterioration from the edges. After 10 days, no surface corrosion in the form of rust was seen on the treated strips and only slight lateral deterioration from the edges was observed. The formation of small salt deposits on the surface of the coating was observed.

Corrosion Trial 8B

Three (4×1×0.03 inches) carbon-steel strips were wetted with 1 mL of fresh solution B using a Pasteur pipette, and the solution was spread all over the metal surface using an 18-inch lightweight T-Bar coating applicator (purchased from Bon Tool). The coated metal strips were then placed in an oven at 120° C. for 30 minutes and were cooled to room temperature for 15 minutes. On the same carbon steel strips was added 1 mL of fresh solution B using a Pasteur pipette, and the solution was spread all over the metal surface using an 18-inch lightweight T-Bar coating applicator (purchased from Bon Tool) for a second time. The coated metal strips were then placed in an oven at 120° C. for 30 minutes and were cooled to room temperature for 15 minutes. Then, using an Rainin automatic pipette, 400 µL of fresh solution A was applied to the edges of the strips, and the strips were placed in an oven at 120° C. for 40 minutes and were cooled to room temperature for 15 minutes. The coated metal strips were placed in a 3.9% saltwater solution for 10 days. Following their removal from the saltwater solution, they were left to dry for 30 minutes before being observed. The untreated strip showed 100% surface corrosion after 24 hours. The treated strips all showed less than 5% surface corrosion after 24, 48, and 72 hours. After 72 hours there was almost no lateral deterioration from the edges. After 10 days, there was some lateral deterioration from the edges.

Corrosion Trial 5A(7A): Double Coat, SZQ

Three (4×1×0.03 inches) carbon-steel strips were wetted with 1 mL of fresh solution A using a Pasteur pipette, and the solution was spread all over the metal surface using a stainless-steel draw bar film applicator of 250 um (purchased from SZQ). The coated metal strips were then placed in an oven at 75° C. for 30 minutes and were cooled to room temperature for 15 minutes. On the same carbon steel strips was added 1 mL of fresh solution A using a Pasteur pipette, and the solution was spread all over the metal surface using a stainless-steel draw bar film applicator of 250 um (purchased from SZQ) for a second time. The coated metal strips were then placed in an oven at 75° C. for 30 minutes and were cooled to room temperature for 15 minutes. The coated metal strips were placed in a 3.9% saltwater solution for 24 hours. Following their removal from the saltwater solution, they were left to dry for 30 minutes before being observed. The untreated strip showed 100% surface corrosion. The treated strips showed less than 5% surface corrosion, respectively. There was some slight lateral deterioration of the treated strips.

Corrosion Trial 5B

Three (4×1×0.03 inches) carbon-steel strips were wetted with 1 mL of fresh solution B using a Pasteur pipette, and the solution was spread all over the metal surface using a stainless-steel draw bar film applicator of 250 um (purchased from SZQ). The coated metal strips were then placed in an oven at 120° C. for 30 minutes and were cooled to room temperature for 15 minutes. On the same carbon steel strips was added 1 mL of fresh solution B using a Pasteur pipette, and the solution was spread all over the metal surface using a stainless-steel draw bar film applicator of 250 um (purchased from SZQ) for a second time. The coated metal strips were then placed in an oven at 120° C. for 30 minutes and were cooled to room temperature for 15 minutes. The coated metal strips were placed in a 3.9% saltwater solution for 24 hours. Following their removal from the saltwater solution, they were left to dry for 30 minutes before being observed. The untreated strip showed 100% surface corrosion. The treated strips showed less than 5% surface corrosion, respectively. There was some slight lateral deterioration of the treated strips.

Corrosion Trial 6: Quadruple Coat, Dip Coat

Three (2×1×0.03 inches) carbon-steel strips were dipped vertically into 50 mL of fresh solution B and placed horizontally onto a glass plate that was placed in an oven at 100° C. for 20 minutes and were cooled to room temperature for 15 minutes. This operation was repeated 3 more times to obtain a quadruple coating. The coated metal strips were placed in a 3.9% saltwater solution for 24 hours. Following their removal from the saltwater solution, they were left to dry for 30 minutes before being observed. The coating delaminated from the strips, but provided some protection compared to the uncoated strip (100% surface corrosion). The coated strips each showed less than 5% surface corrosion, respectively.

Corrosion Trial 16: Single Coat, Dip Coat; 20% Polymer Solution

Three (2×1×0.03 inches) carbon-steel strips were dipped vertically into 15 mL of a freshly prepared solution of poly(styrene-catechol) in DMC (0.2 mg/mL) and placed horizontally onto a glass plate that was placed in an oven at 100° C. for 20 minutes and were cooled to room temperature for 15 minutes. The coated metal strips were placed in a 3.9% saltwater solution for 24 hours. Following their removal from the saltwater solution, they were left to dry for 30 minutes before being observed. The uncoated strip showed 100% surface corrosion. The coated strips showed 65%, 80%, and 65% surface corrosion, respectively. The strips also showed delamination of the polymer coating and some pitting of the strips.

The above experiment was repeated except the strips were treated a second time with the polymer solution yielding doubly coated strips. The untreated control showed 100% surface corrosion. The treated strips showed severe delamination and 80%, 90%, and 70% surface corrosion, respectively.

Corrosion Trial 7A: Dip Coat, Horizontal Coat

Three (2×1×0.03 inches) carbon-steel strips were dipped horizontally into 50 mL of fresh solution B. They were removed from the solution, and the polymer solution layer was evenly spread all over the surface using an 18-inch lightweight T-Bar coating applicator. The strips were then placed horizontally onto a glass plate that was placed in an oven at 100° C. for 1 hour and were cooled to room temperature for 15 minutes. The coated metal strips were placed in a 3.9% saltwater solution for 24 hours. Following their removal from the saltwater solution, they were left to dry for 30 minutes before being observed. The untreated strip showed 100% surface corrosion. The treated strips showed <5%, 5%, and <5% surface corrosion, respectively. The treated strips also showed some lateral deterioration from the edges.

Corrosion Trial 7B

Three (2×1×0.03 inches) carbon-steel strips were dipped horizontally into 50 mL of fresh solution B. They were removed from the solution, and the polymer solution layer was evenly spread all over the surface using an 18-inch lightweight T-Bar coating applicator. The strips were then placed horizontally onto a glass plate that was placed in an oven at 100° C. for 30 minutes and were cooled to room temperature for 15 minutes. This operation was repeated once to obtain a double coat. The coated metal strips were placed in a 3.9% saltwater solution for 24 hours. Following their removal from the saltwater solution, they were left to dry for 30 minutes before being observed. The untreated strip showed 100% surface corrosion. The three treated strips showed <5%, 5%, and <5% surface corrosion, respectively. The treated strips showed 56% edge passivation.

The above coating process was performed on three additional (2×1×0.03 inches) carbon-steel strips, except the coating process was performed four times. The results were nearly identical to the results of the doubly coated strips.

Corrosion Trial 108B

Three (4×1×0.03 inches) carbon-steel strips were wetted with 1 mL of fresh solution A, in which Rhodamine B dye (a few mg) was added, using a Pasteur pipette, and the solution was spread all over the metal surface using an 18-inch lightweight T-Bar coating applicator (purchased from Bon Tool). The coated metal strips were then placed in an oven at 75° C. for 30 minutes and were cooled to room temperature for 15 minutes. On the same carbon steel strips was added 1 mL of fresh solution A, in which Rhodamine B dye (a few mg) was added, using a Pasteur pipette, and the solution was spread all over the metal surface using an 18-inch lightweight T-Bar coating applicator (purchased from Bon Tool) for a second time. The coated metal strips were then placed in an oven at 75° C. for 30 minutes and were cooled to room temperature for 15 minutes. The coated metal strips were placed in a 3.9% saltwater solution for 24 hours. Following their removal from the saltwater solution, they were left to dry for 30 minutes before being observed. The polymer coating delaminated resulting in about 25% surface corrosion in the treated strip. As before, the untreated strip showed 100% surface corrosion.

Corrosion Trial 108C

Three (4×1×0.03 inches) carbon-steel strips were wetted with 1 mL of fresh solution B, in which Rhodamine B dye (a few mg) was added, using a Pasteur pipette, and the solution was spread all over the metal surface using an 18-inch lightweight T-Bar coating applicator (purchased from Bon Tool). The coated metal strips were then placed in an oven at 120° C. for 30 minutes and were cooled to room temperature for 15 minutes. On the same carbon steel strips was added 1 mL of fresh solution B, in which Rhodamine B dye (a few mg) was added, using a Pasteur pipette, and the solution was spread all over the metal surface using an 18 inch lightweight T-Bar coating applicator (purchased from Bon Tool) for a second time. The coated metal strips were then placed in an oven at 120° C. for 30 minutes and were cooled to room temperature for 15 minutes. The coated metal strips were placed in a 3.9% saltwater solution for 24 hours. Following their removal from the saltwater solution, they were left to dry for 30 minutes before being observed. The untreated strip showed 100% surface corrosion. The treated strips showed good adhesion of the polymer coating and less than 5% surface corrosion.

Corrosion Trials with Additives

Because the polymer coatings on the treated metal strips were brittle the effect of additives or plasticizers on coating hardness and adhesion was investigated.

Two common tests were used. To measure hardness the Wolff-Wilborn test, or pencil hardness test was used. The pencil tests uses pencil leads of different hardness to determine how scratch resistant a coating is. The hardness of the pencil lead is labeled from the hardest 9H, 8H, 7H, 6H, 5H, 4H, 3H, 2H, H, F, HB, B, 2B, 3B, 4B, 5B, 6B, 7B, 8B, 9B to the softest.

Adhesion was measured by what is commonly called the cross-hatch test. After cutting a cross-hatched pattern into the coating adhesion is measured by applying tape to the cross-hatch pattern, removing the tape and observing the amount of coating removed. The scale is shown in FIG. 1.

Corrosion Testing—Glycerol Additive

One (4×1×0.03 inches) carbon-steel strip was wetted with 300 μL of fresh solution B, in which 5 wt % or 10 wt % glycerol was added, using a Pasteur pipette, and the solution was spread all over the metal surface using an 18 inch lightweight T-Bar coating applicator. The coated metal strips were then placed in an oven at 100° C. for 1 hour and were cooled to room temperature for 15 minutes. The coated metal strips were placed in a 3.9% saltwater solution for 25 hours. Following their removal from the saltwater solution, they were left to dry for 30 minutes before being observed. The untreated strips showed 100% surface corrosion. The test strip treated with the solution containing 5 wt % glycerol showed less than 5% surface corrosion. The test strip treated with the solution containing 10 wt % glycerol showed less than 5% surface corrosion, but some pitting of the polymer coating.

Coating Characterization Comparatives

Coatings were applied as above. Testing occurred after curing (dry) and after the cured test strips were placed in a 3.9% saltwater solution for 24 hours (UW) rhodB indicates the presence of a small amount of rhodamine B in the coating solution.

Wet coating thicknesses were measured with a KTA aluminum wet film thickness gauge (such as one supplied by KTA TATOR, 145 Enterprise Dr, Pittsburgh, PA 15275). For a 10% poly(styrene-catechol) soln. in DMC, coating thickness range using T-Bar applicator was from 12-16 MIL (or 300-400 μm). Using 4-sided film applicator (250 μm side) the coating thickness was from 12-16 MIL (300-400 μm).

TABLE 1

| Identity | Wt % | Pencil (dry) | Cross Hatch (dry) | Pencil (dry rhodB) | Cross Hatch (dry rhodB) |
|---|---|---|---|---|---|
| Polystyrene in DMC | 1 | N/A | N/A | N/A | N/A |
|  | 2.5 | HB < x < 2H | ISO 2 (~10%) | HB < x < 2H | ISO 2 (~10%) |
| ($T_{cure}$ = 100° C.) | 5 | HB < x < 2H | ISO 1 (<5%) | 1B < x < HB | ISO 1 (<5%) |
|  | 10 | HB < x < 2H | ISO 1 (<5%) | HB < x < 2H | ISO 1 (<5%) |
|  | 20 | HB < x < 2H | ISO 3 (20-25%) | HB < x < 2H | ISO 4 (>50%) |
| Poly | 1 | N/A | N/A | N/A | N/A |
| (styrene$_{0.75}$-catechol$_{0.25}$) in DMC | 2.5 | 1B < x < HB? | ISO 1 (<5%) | 1B < x < HB? | ISO 1 (<5%) |
| ($T_{cure}$ = 100° C.) | 5 | HB < x < 2H | ISO 1 (<5%) | HB < x < 2H | ISO 1 (<5%) |
|  | 10 | HB < x < 2H | ISO 2 (~10%) | 4H < x < 6H | ISO 2 (~10%) |
|  | 20 | HB < x < 2H | ISO 3 (15-20%) | HB < x < 2H | ISO 2 (15%) |

| Identity | Wt % | Pencil (UW, 24 h) | Cross Hatch (UW, 24 h) | Pencil (UW, 24 h rhodB) | Cross Hatch (UW, 24 h rhodB) |
|---|---|---|---|---|---|
| Polystyrene in DMC | 1 | N/A | N/A | N/A | N/A |
|  | 2.5 | 2B < x < B (?) | ISO 1 (<5%) | 1B < x < HB | N/A |
| ($T_{cure}$ = 100° C.) | 5 | HB < x < 2H | ISO 3 (25%) | 1B < x < HB | ISO 4/5 (65%) |
|  | 10 | 1B < x < HB | ISO 4 (50%) | 1B < x < HB | ISO 3/4 (35%) |
|  | 20 | HB < x < 2H | ISO 2 (~10-15%) | HB < x < 2H | ISO 3 (25%) |
| Poly | 1 | N/A | N/A | N/A | N/A |
| (styrene$_{0.75}$-catechol$_{0.25}$) in DMC | 2.5 | HB < x < 2H | ISO 2 (~10%) | HB < x < 2H | ISO 2 (10-15%) |
| ($T_{cure}$ = 100° C.) | 5 | 1B < x < HB | ISO 5 (~70%) | HB < x < 2H | ISO 5 (80%) |
|  | 10 | 4H < x < 6H | ISO 2 (~10-15%) | 4H < x < 6H | ISO 1 (<5%) |
|  | 20 | 4H < x < 6H | ISO 2 (~10-15%) | 4H < x < 6H | ISO 3 (20-25%) |

Plasticizers tested included tributyl O-acetylcitrate, triacetin, di-n-octyl phthalate, and di-octyl sebacate.

TABLE 2

| Plasticizer Identity | Wt % | Pencil (dry) | Cross Hatch (dry) | Pencil (dry rhodB) | Cross Hatch (dry rhodB) |
|---|---|---|---|---|---|
| Tributyl | 0* | 2H < x < 4H | ISO 1 (<5%) | HB < x < 2H | ISO 0 (~0%) |
| O-Acetylcitrate | 5 | 1B < x < HB | ISO 1 (<5%) | 2B < x < 1B | ISO 0 (~0%) |
|  | 10 | 1B < x < HB | ISO 0 (~0%) | HB < x < 2H | ISO 0 (~0%) |
|  | 20 | HB < x < 2H | ISO 0 (~0%) | HB < x < 2H | ISO 0 (~0%) |
| Di-n-Octyl | 0 | 6H < x < WSc | ISO 1 (<5%) | 6H < x < WSc | ISO 1 (~5%) |
| Phthalate | 5 | 6H < x < WSc | ISO 0 (~0%) | 6H < x < WSc | ISO 0 (~0%) |
|  | 10 | (?) | ISO 0 (~0%) | (?) | ISO 0 (~0%) |
|  | 20 | (?) | ISO 3 (20%) | (?) | ISO 3 (20%) |
| Triacetin | 0 | 6H < x < WSc | ISO 0 (~0%) | 6H < x < WSc | ISO 0 (~0%) |
|  | 5 | 6H < x < WSc | ISO 0 (~0%) | 6H < x < WSc | ISO 0 (~0%) |
|  | 10 | 6H < x < WSc | ISO 0 (~0%) | 6H < x < WSc | ISO 0 (~0%) |
|  | 20 | 6H < x < WSc | ISO 0 (~0%) | 6H < x < WSc | ISO 0 (~0%) |
| Dioctyl | 0 | 6H < x < WSc | ISO 1 (<5%) | 6H < x < WSc | ISO 1 (<5%) |
| Sebacate | 5 | 2H < x < 4H | ISO 0 (~0%) | 2H < x < 4H | ISO 0 (~0%) |
| (UW, 48 hr) | 10 | <12B | ISO 3a/ISO 5c | <12B | ISO 3a/ISO 5c |
|  | 20 | <12B | ISO 5a, c | <12B | ISO 5a, c |

| Plasticizer Identity | Wt % | Pencil (UW, 24 h) | Cross Hatch (UW, 24 h) | Pencil (UW, 24 h rhodB) | Cross Hatch (UW, 24 h rhodB) |
|---|---|---|---|---|---|
| Tributyl | 0* | 2H < x < 4H | ISO 2 (5-15%) | HB < x < 2H | ISO 5 (~75%) |
| O-Acetylcitrate | 5 | 1B < x < HB | ISO 0 (~0%) | HB < x < 2H | ISO 0 (~0%) |
|  | 10 | HB < x < 2H | ISO 3 (15-35%) | 2B < x < 1B | ISO 1 (<5%) |
|  | 20 | 1B < x < HB | ISO 3 (15-35%) | HB < x < 2H | ISO 5 (~75%) |
| Di-n-Octyl | 0 | 2H < x < 4H | ISO 2 (10-15%) | 2H < x < 4H | ISO 3 (20-30%) |
| Phthalate | 5 | HB < x < 2H | ISO 0 (~0%) | HB < x < 2H | ISO 0 (~0%) |
|  | 10 | <12B | ISO 5 (coh.) | <12B | ISO 5 (coh.) |
|  | 20 | <12B | ISO 5 (coh.) | <12B | ISO 5 (coh.) |
| Triacetin | 0 | 6H < x < WSc | ISO 1 (<5%) | 6H < x < WSc | ISO 2 (15%) |
|  | 5 | 6H < x < WSc | ISO 1 (<5%) | 6H < x < WSc | ISO 1 (<5%) |
|  | 10 | 6H < x < WSc | ISO 3 (15-35%) | 6H < x < WSc | ISO 2 (15%) |
|  | 20 | 6H < x < WSc | ISO 1 (<5%) | 6H < x < WSc | ISO 1 (<5%) |
| Dioctyl | 0 | 4H < x < 6H | ISO 4 (50-60%) | 4H < x < 6H | ISO 4 (~35%) |
| Sebacate | 5 | 2H < x < 4H | ISO 2 (5-10%) | HB < x < 2H | ISO 1 (~5%) |
| (UW, 48 hr) | 10 | <12B | ISO 0a/+ coh. | <12B | ISO 0a/+ coh. |
|  | 20 | <12B | ISO 5 (coh.) | <12B | ISO 5 (coh.) | a indicates adhesive failure,
c indicates cohesive failure.
a, c indicates a combination of failure types
coh and +coh indicate that cohesive failure of the coating was also seen

TABLE 3

Square Coat Comparisons (Single vs. Double orthogonal coat)

| | Method | Single | Single (rhod. B) | Double (orth.) | Double (orth, rhod. B) |
|---|---|---|---|---|---|
| Dry (cure 120° C., o/n) | Pencil | 6H < x < WS | 6H < x < WS | 6H < x < WS | 6H < x < WS |
| | Cross Hatch | ISO 0 (~0%) | ISO 0 (~0%) | ISO 0 (~0%) | ISO 0 (~0%) |
| $UW_{NaCl}$ 24 hr | Pencil | HB < x < 2H | HB < x < 2H | B < x < HB | HB < x < 2H |
| | Cross Hatch | ISO 5 (~100%) | ISO 5 (~100%) | ISO 5 (~100%) | ISO 5 (~100%) |

Three test strips prepared for single and double coating. One test strip in each triplet used to measure hardness and adhesion. Single coat test strips showed 10%, <500, and <5% rust. Double coat test strips showed 10%, 10%, and <50% surface corrosion. Single coat test strips with rhodamine B add showed 15%, 5%, and 10% rust. Double coat test strips showed 20%, 5% and <5% surface corrosion.

TABLE 4

Plasticizer Comparisons (0, 5, 10, 20 wt %, cure 100° C., o/n)

| Plasticizer Identity | Wt % | Pencil (dry) | Cross Hatch (dry) | Pencil (dry rhodB) | Cross Hatch (dry rhodB) |
|---|---|---|---|---|---|
| Tributyl O-Acetylcitrate | 0* | 2H < x < 4H | ISO 1 (<5%) | HB < x < 2H | ISO 0 (~0%) |
| | 5 | 1B < x < HB | ISO 1 (<5%) | 2B < x < 1B | ISO 0 (~0%) |
| | 10 | 1B < x < HB | ISO 0 (~0%) | HB < x < 2H | ISO 0 (~0%) |
| | 20 | HB < x < 2H | ISO 0 (~0%) | HB < x < 2H | ISO 0 (~0%) |
| Di-n-Octyl Phthalate | 0 | 6H < x < WSc | ISO 1 (<5%) | 6H < x < WSc | ISO 1 (~5%) |
| | 5 | 6H < x < WSc | ISO 0 (~0%) | 6H < x < WSc | ISO 0 (~0%) |
| | 10 | (?) | ISO 0 (~0%) | (?) | ISO 0 (~0%) |
| | 20 | (?) | ISO 3 (20%) | (?) | ISO 3 (20%) |
| Triacetin | 0 | 6H < x < WSc | ISO 0 (~0%) | 6H < x < WSc | ISO 0 (~0%) |
| | 5 | 6H < x < WSc | ISO 0 (~0%) | 6H < x < WSc | ISO 0 (~0%) |
| | 10 | 6H < x < WSc | ISO 0 (~0%) | 6H < x < WSc | ISO 0 (~0%) |
| | 20 | 6H < x < WSc | ISO 0 (~0%) | 6H < x < WSc | ISO 0 (~0%) |

| | Wt % | Pencil (UW, 24 h) | Cross Hatch (UW, 24 h) | Pencil (UW, 24 h rhodB) | Cross Hatch (UW, 24 h rhodB) |
|---|---|---|---|---|---|
| Tributyl O-Acetylcitrate | 0* | 2H < x < 4H | ISO 2 (5-15%) | HB < x < 2H | ISO 5 (~75%) |
| | 5 | 1B < x < HB | ISO 0 (~0%) | HB < x < 2H | ISO 0 (~0%) |
| | 10 | HB < x < 2H | ISO 3 (15-35%) | 2B < x < 1B | ISO 1 (<5%) |
| | 20 | 1B < x < HB | ISO 3 (15-35%) | HB < x < 2H | ISO 5 (~75%) |
| Di-n-Octyl Phthalate | 0 | 2H < x < 4H | ISO 2 (10-15%) | 2H < x < 4H | ISO 3 (20-30%) |
| | 5 | HB < x < 2H | ISO 0 (~0%) | HB < x < 2H | ISO 0 (~0%) |
| | 10 | <12B | ISO 5 (coh.) | <12B | ISO 5 (coh.) |
| | 20 | <12B | ISO 5 (coh.) | <12B | ISO 5 (coh.) |
| Triacetin | 0 | 6H < x < WSc | ISO 1 (<5%) | 6H < x < WSc | ISO 2 (15%) |
| | 5 | 6H < x < WSc | ISO 1 (<5%) | 6H < x < WSc | ISO 1 (<5%) |
| | 10 | 6H < x < WSc | ISO 3 (15-35%) | 6H < x < WSc | ISO 2 (15%) |
| | 20 | 6H < x < WSc | ISO 1 (<5%) | 6H < x < WSc | ISO 1 (<5%) |

TABLE 5

Square Coat Plasticizer Comparisons (0, 2.5, 5, 7.5 wt %, cure 120° C., o/n)

| Plasticizer Identity | Wt % | Pencil (dry) | Cross Hatch (dry) | Pencil (dry rhodB) | Cross Hatch (dry rhodB) |
|---|---|---|---|---|---|
| Tributyl O-Acetylcitrate | 0 | 6H < x < WS | ISO 0 (~0%) | 6H < x < WS | ISO 0 (~0%) |
| | 2.5 | 6H < x < WS | ISO 0 (~0%) | 6H < x < WS | ISO 0 (~0%) |
| | 5 | 6H < x < WS | ISO 0 (~0%) | 6H < x < WS | ISO 0 (~0%) |
| | 7.5 | 6H < x < WS | ISO 0 (~0%) | 6H < x < WS | ISO 0 (~0%) |
| Di-n-Octyl Phthalate | 0 | 6H < x < WS | ISO 0 (~0%) | 6H < x < WS | ISO 0 (~0%) |
| | 2.5 | 6H < x < WS | ISO 0 (~0%) | 6H < x < WS | ISO 0 (~0%) |
| | 5 | 6H < x < WS | ISO 0 (~0%) | 6H < x < WS | ISO 0 (~0%) |
| | 7.5 | 6H < x < WS | ISO 0 (~0%) | 6H < x < WS | ISO 0 (~0%) |

| | Wt % | Pencil (UW, 24 h) | Cross Hatch (UW, 24 h) | Pencil (UW, 24 h rhodB) | Cross Hatch (UW, 24 h rhodB) |
|---|---|---|---|---|---|
| Tributyl O-Acetylcitrate | 0 | 2H < x < 4H | ISO 5 (coh/ad) | 4H < x < 6H | ISO 3 |
| | 2.5 | 6H < x < WS | ISO 5 (coh/ad) | 4H < x < 6H | ISO 5 |

TABLE 5-continued

Square Coat Plasticizer Comparisons (0, 2.5, 5, 7.5 wt %, cure 120° C., o/n)

| | | | | | |
|---|---|---|---|---|---|
| | 5 | 6H < x < WS | ISO 5 | HB < x < 2H | ISO 4 |
| | 7.5 | 6H < x < WS | ISO 5 | 4H < x < 6H | ISO 5 |
| Di-n-Octyl Phthalate | 0 | 2H < x < 4H | ISO 5 (60-70%) | HB < x < 2H | ISO 5 (coh.) |
| | 2.5 | 2B < x < B | ISO 4 (50%)** | 2H < x < 4H | ISO 3 (20%) |
| | 5 | 4H < x < 6H | ISO 4 (40%) | 6H < x < WS | ISO 1 (~5%) |
| | 7.5 | B < x < HB | ISO 3 (20%) | 6H < x < WS | ISO 1 (~5%) |

TABLE 5B

Square Coat Plasticizer Comparisons, cure 100° C., o/n, thick coat

| Plasticizer Identity | Wt % | Pencil (dry) | Cross Hatch (dry) | Pencil (dry rhodB) | Cross Hatch (dry rhodB) |
|---|---|---|---|---|---|
| Tributyl O-Acetylcitrate | 0 | 6H < x < WS | ISO 2 (~10%) | 6H < x < WS | ISO 2 (~10%) |
| | 2.5 | 6H < x < WS | ISO 2 (~10%) | 6H < x < WS | ISO 2 (~10%) |
| | 5 | 6H < x < WS | ISO 2 (~10%) | 6H < x < WS | ISO 1 (~5%) |
| | 7.5 | 6H < x < WS | ISO 1 (~5%) | 6H < x < WS | ISO 1 (~5%) |
| Di-n-Octyl Phthalate | 0 | 6H < x < WS | ISO 5 (65%) | 6H < x < WS | ISO 5 (70%) |
| | 2.5 | 6H < x < WS | ISO 0 (~0%) | 6H < x < WS | ISO 1 (5%) |
| | 5 | 6H < x < WS | ISO 0 (~0%) | 6H < x < WS | ISO 0 (~0%) |
| | 7.5 | 6H < x < WS | ISO 0* (coh.) | 6H < x < WS | ISO 0* (coh.) |
| Triacetin | 0 | 6H < x < WS | ISO 3 (25%) | 6H < x < WS | ISO 4 (40%) |
| | 2.5 | 6H < x < WS | ISO 3 (15-20%) | 6H < x < WS | ISO 4 (40%) |
| | 5 | 6H < x < WS | ISO 1 (10%) | 6H < x < WS | ISO 4 (40%) |
| | 7.5 | 6H < x < WS | ISO 3 (15-20%) | 6H < x < WS | ISO 4 (40%) |
| Bis(2-ethylhexyl) sebacate | 0 | 6H < x < WS | ISO 3 (15-20%) | 6H < x < WS | ISO 3 (15-20%) |
| | 2.5 | 6H < x < WS | ISO 0 (0%) | 6H < x < WS | ISO 0 (0%) |
| | 5 | 6H < x < WS | ISO 0* (coh f.) | 6H < x < WS | ISO 0* (coh f.) |
| | 7.5 | 6H < x < WS* | (coh. f.) | 6H < x < WS* | (coh. f.) |

| Plasticizer Identity | Wt % | Pencil (UW, 24 h) | Cross Hatch (UW, 24 h) | Pencil (UW, 24 h rhodB) | Cross Hatch (UW, 24 h rhodB) |
|---|---|---|---|---|---|
| Tributyl O-Acetylcitrate | 0 | 4H < x < 6H | ISO 5 (>65%) | 4H < x < 6H | ISO 4 (<40%) |
| | 2.5 | 6H < x < WS | ISO 1 (~5%) | 6H < x < WS | ISO 1 (~5%) |
| | 5 | 6H < x < WS | ISO 1 (~5%) | 6H < x < WS | ISO 1 (~5%) |
| | 7.5 | 6H < x < WS | ISO 3 (20%) | 6H < x < WS | ISO 0 (~0%) |
| Di-n-Octyl Phthalate | 0 | 2H < x < 4H | ISO 5 (>65%) | 2H < x < 4H | ISO 5 (>65%) |
| | 2.5 | 6H < x < WS | ISO 3 (30%) | 6H < x < WS | ISO 3 (25%) |
| | 5 | 6H < x < WS | ISO 0 (~0%) | 6H < x < WS | ISO 0 (~0%) |
| | 7.5 | 6H < x < WS* | ISO 0* (coh.) | 6H < x < WS* | ISO 0* (coh f.) |
| Triacetin | 0 | 2H < x < 4H | ISO 4 (50%) | 2H < x < 4H | ISO 5 (>65%) |
| | 2.5 | 2H < x < 4H | ISO 5 (>65%) | 2H < x < 4H | ISO 5 (>65%) |
| | 5 | 2H < x < 4H | ISO 4 (40%) | 2H < x < 4H | ISO 5 (>65%) |
| | 7.5 | 4H < x < 6H | ISO 4 (50%) | 4H < x < 6H | ISO 5 (>65%) |
| Bis(2-ethylhexyl) sebacate | 0 | 2H < x < 4H | ISO 5 (>65%) | 2H < x < 4H | ISO 5 (>65%) |
| | 2.5 | 6H < x < WS | ISO 0 (0%) | 6H < x < WS | ISO 0 (0%) |
| | 5 | 6H < x < WS | ISO 0* (coh.) | 6H < x < WS | ISO 0* (coh.) |
| | 7.5 | 6H < x < WS* | (coh.) | 6H < x < WS* | (coh.) | coh. cohesion failure

TABLE 5C

Square Coat Plasticizer Comparisons, cure 100° C., o/n T-Bar thin spread coat

| Plasticizer Identity | Wt % | Pencil (dry) | Cross Hatch (dry) | Pencil (dry rhodB) | Cross Hatch (dry rhodB) |
|---|---|---|---|---|---|
| Tributyl O-Acetylcitrate | 0 | 6H < x < WS | ISO 0 (~0%) | 6H < x < WS | ISO 0 (~0%) |
| | 2.5 | 6H < x < WS | ISO 0 (~0%) | 6H < x < WS | ISO 0 (~0%) |
| | 5 | 6H < x < WS | ISO 0 (~0%) | 6H < x < WS | ISO 0 (~0%) |
| | 7.5 | 6H < x < WS | ISO 0 (~0%) | 6H < x < WS | ISO 0 (~0%) |
| Di-n-Octyl Phthalate | 0 | 6H < x < WS | ISO 0 (~0%) | 6H < x < WS | ISO 0 (~0%) |
| | 2.5 | 6H < x < WS | ISO 0 (~0%) | 6H < x < WS | ISO 0 (~0%) |
| | 5 | 6H < x < WS | ISO 0 (~0%) | 6H < x < WS | ISO 0 (~0%) |
| | 7.5 | 6H < x < WS | ISO 0* (coh f.) | 6H < x < WS | ISO 0* (coh f.) |

TABLE 5C-continued

Square Coat Plasticizer Comparisons, cure 100° C., o/n T-Bar thin spread coat

| | | | | | |
|---|---|---|---|---|---|
| Triacetin | 0 | 6H < x < WS | ISO 1 (<5%) | 6H < x < WS | ISO 1 (<5%) |
| | 2.5 | 6H < x < WS | N/A | 6H < x < WS | ISO 0 (~0%) |
| | 5 | 6H < x < WS | ISO 0 (~0%) | 6H < x < WS | ISO 1 (<5%) |
| | 7.5 | 6H < x < WS | ISO 1 (<5%) | 6H < x < WS | ISO 0 (~0%) |
| Bis(2-ethylhexyl) sebacate | 0 | 6H < x < WS | ISO 1 (<5%) | 6H < x < WS | ISO 1 (<5%) |
| | 2.5 | 6H < x < WS | ISO 0 (0%) | 6H < x < WS | ISO 0 (0%) |
| | 5 | 6H < x < WS | ISO 0* (coh f.) | 6H < x < WS | ISO 0* (coh f.) |
| | 7.5 | 6H < x < WS* | (coh. f.) | 6H < x < WS* | (coh. f.) |

| Plasticizer Identity | Wt % | Pencil (UW, 24 h) | Cross Hatch (UW, 24 h) | Pencil (UW, 24 h rhodB) | Cross Hatch (UW, 24 h rhodB) |
|---|---|---|---|---|---|
| Tributyl O-Acetylcitrate | 0 | HB < x < 2H | ISO 5 | HB < x < 2H | ISO 5 |
| | 2.5 | B < x < HB | ISO 4 | B < x < HB | ISO 3 |
| | 5 | HB < x < 2H | ISO 2 | HB < x < 2H | ISO 2 |
| | 7.5 | HB < x < 2H | ISO 4 | HB < x < 2H | ISO 3 |
| Di-n-Octyl Phthalate | 0 | 2H < x < 4H | ISO 5 (>65%) | 2H < x < 4H | ISO 5 (>65%) |
| | 2.5 | 6H < x < WS | ISO 2 (~10%) | 6H < x < WS | ISO 1 (~5%) |
| | 5 | 6H < x < WS | ISO 0 (~0%) | 6H < x < WS | ISO 0 (~0%) |
| | 7.5 | 6H < x < WS* | ISO 0* (coh) | 6H < x < WS* | ISO 0* (coh) |
| Triacetin | 0 | 6H < x < WS | ISO 3 (15-20%) | 6H < x < WS | ISO 3 (15-20%) |
| | 2.5 | 6H < x < WS | ISO 3 (15-20%) | 6H < x < WS | ISO 3 (15-20%) |
| | 5 | 6H < x < WS | ISO 3 (15-20%) | 6H < x < WS | ISO 3 (15-20%) |
| | 7.5 | 6H < x < WS | ISO 3 (15-20%) | 6H < x < WS | ISO 3 (15-20%) |
| Bis(2-ethylhexyl) sebacate | 0 | 4H < x < 6H | ISO 2 (10%) | 4H < x < 6H | ISO 2 (15%) |
| | 2.5 | 6H < x < WS | ISO 0 (0%) | 6H < x < WS | ISO 0 (0%) |
| | 5 | 6H < x < WS | ISO 0* (coh f.) | 6H < x < WS | ISO 0* (coh f.) |
| | 7.5 | 6H < x < WS* | (coh. f.) | 6H < x < WS* | (coh. f.) |

Citrate Comparisons

Curing at 120° C. resulted in worse surface adhesion following submersion. Retested lower wt % with original cure temperature (100° C.) (0, 2.5, 5, 7.5 wt %)

1st trial: used 250 um side of 4-sided film applicator to produce thicker coatings for analysis.

Thicker Coatings=more delamination, greater brittleness

Thickness of cured coat was measured with Defelsko Positector 6000 device and determined the thickness to be 3.67±MIL 1.73 MIL (n=61).

2nd trial: used T-Bar to produce more uniform, thinner coatings compared to trial 1

Thinner Coatings=less delamination, less chipping

Thickness of cured coat 1.874 MIL±0.067 MIL (n=50) for 1× application,

TABLE 6

| Plasticizer Identity | Wt % | Pencil (dry) | Cross Hatch (dry) | Pencil (dry rhodB) | Cross Hatch (dry rhodB) |
|---|---|---|---|---|---|
| Tributyl O-Acetylcitrate cure: 120° C. | 0 | 6H < x < WS | ISO 0 (~0%) | 6H < x < WS | ISO 0 (~0%) |
| | 2.5 | 6H < x < WS | ISO 0 (~0%) | 6H < x < WS | ISO 0 (~0%) |
| | 5 | 6H < x < WS | ISO 0 (~0%) | 6H < x < WS | ISO 0 (~0%) |
| | 7.5 | 6H < x < WS | ISO 0 (~0%) | 6H < x < WS | ISO 0 (~0%) |
| Tributyl O-Acetylcitrate cure: 100° C. (Trial 1, thick coating) | 0 | 6H < x < WS | ISO 2 (~10%) | 6H < x < WS | ISO 2 (~10%) |
| | 2.5 | 6H < x < WS | ISO 2 (~10%) | 6H < x < WS | ISO 2 (~10%) |
| | 5 | 6H < x < WS | ISO 2 (~10%) | 6H < x < WS | ISO 1 (~5%) |
| | 7.5 | 6H < x < WS | ISO 1 (~5%) | 6H < x < WS | ISO 1 (~5%) |
| Tributyl O-Acetylcitrate cure: 100° C. (Trial 2, thin coating) | 0 | 6H < x < WS | ISO 0 (~0%) | 6H < x < WS | ISO 0 (~0%) |
| | 2.5 | 6H < x < WS | ISO 0 (~0%) | 6H < x < WS | ISO 0 (~0%) |
| | 5 | 6H < x < WS | ISO 0 (~0%) | 6H < x < WS | ISO 0 (~0%) |
| | 7.5 | 6H < x < WS | ISO 0 (~0%) | 6H < x <WS | ISO 0 (~0%) |

| Plasticizer Identity | Wt % | Pencil (UW, 24 h) | Cross Hatch (UW, 24 h) | % Rust | Pencil (UW, 24 h rhodB) | Cross Hatch (UW, 24 h rhodB) |
|---|---|---|---|---|---|---|
| Tributyl O-Acetylcitrate cure: 120° C. | 0 | 2 H < x < 4 H | ISO 5 (coh/ad) | <5 | 4H < x <6H | ISO 3 |
| | 2.5 | 6H < x < WS | ISO 5 (coh/ad) | <5 | 4H < x < 6H | ISO 5 |
| | 5 | 6H < x < WS | ISO 5 | 10 | HB < x < 2H | ISO 4 |
| | 7.5 | 6H < x < WS | ISO 5 | 15 | 4H < x < 6H | ISO 5 |
| Tributyl O-Acetylcitrate | 0 | 4H < x <6H | ISO 5 (<65%) | <5 | 4H < x < 6H | ISO 4 (<40%) |

TABLE 6-continued

| | | | | | | |
|---|---|---|---|---|---|---|
| cure: 100° C. | 2.5 | 6H < x < WS | ISO 1 (~5%) | <5 | 6H < x < WS | ISO 1 (~5%) |
| (Trial 1, thick coating) | 5 | 6H < x < WS | ISO 1 (~5%) | 5 | 6H < x < WS | ISO 1 (~5%) |
| | 7.5 | 6H < x < WS | ISO 3 (20%) | <5 | 6H < x < WS | ISO 0 (~0%) |
| Tributyl O-Acetylcitrate | 0 | HB < x < 2H | ISO 5 | <5 | HB < x < 2H | ISO 5 |
| cure: 100° C. | 2.5 | B < x < HB | ISO 4 | <5 | B < x < HB | ISO 3 |
| (Trial 2, thin coating) | 5 | HB < x < 2H | ISO 2 | <5 | HB < x < 2H | ISO 2 |
| | 7.5 | HB < x < 2H | ISO 4 | <5 | HB < x < 2H | ISO 3 |

Preliminary Plasticizer Summary

Triacetin & tributyl-o-acetylcitrate do not fully mitigate brittleness, chipping, delamination, or adhesive failure (from 0 to 20 wt %)

Di-n-octyl phthalate produces minutely tacky coating with retention of hardness and excellent adhesion to substrate at 5.0 wt %

Bis(2-ethylhexyl) sebacate produces a non-tacky coating with retention of hardness and excellent adhesion to substrate at 2.5 wt %

Primer Coat on Carbon Steel Substrates

A dry primer coat is generally 2-3 MIL. Using solely the standard 1000 PSC solution, (no plasticizer) cast a 20 MIL, wet coating=500 um. Allowed to dry at room temperature (RT) for 1 hour, cured at 100° C. o/n, UW NaCl 24 hr. Only the PC (propylene carbonate) coating showed significant improvement in substrate adhesion and target thickness compared to using DMC

TABLE 7

| Solvent (BP° C.) | PSC Solubility | Pencil Test | Cross Hatch | Post-Cure Appearance | Thickness (MIL) | Solvent Rub Test (MEK) |
|---|---|---|---|---|---|---|
| hydro | Good | 6H dry | ISO3 dry | Tiger Striped, Delaminated | 1.92 ± 0.30 | <20 |
| 2-Me—THF (80) | Good | 6H dry | ISO3 dry | Even, black | 1.07 ± 0.13 | <20 |
| IPA (82.5) | Poor | N/A | N/A | N/A | N/A | N/A |
| DMC (90) | Good | 6H dry | ISO5 dry | Even, black | 2.12 ± 0.24 | <15 |
| Ethyl Lactate (154) | Good | 6H dry | ISO4 dry | Webbed, black shallow craters | 1.71 ± 0.80 | <20 |
| PC (242) | Good | 6H dry | ISO1 dry | Even, Amber | 2.41 ± 0.19 | <10 |

Hydrophobic Plasticizer Optimization

TABLE 8

| 10% PSC in DMC, cure 100° C., o/n: Thick coat | | | | | |
|---|---|---|---|---|---|
| Plasticizer Identity | Wt % | Pencil (dry) | Cross Hatch (dry) | Pencil (dry rhodB) | Cross Hatch (dry rhodB) |
| Di-n-Octyl Phthalate | 3 | 6H < x < WS | ISO 1 | 6H < x < WS | ISO 1 |
| | 3.5 | 6H < x < WS | ISO 1 | 6H < x < WS | ISO 1 |
| | 4 | 6H < x < WS | ISO 0 (~0%) | 6H < x < WS | ISO 0 (~0%) |
| | 4.5 | 6H < x < WS | ISO 0 (~0%) | 6H < x < WS | ISO 0 (~0%) |
| Bis(2-ethylhexyl) sebacate | 1.5 | 6H < x < WS | ISO 1 | 6H < x < WS | ISO 1 |
| | 2 | 6H < x < WS | ISO 1 | 6H < x < WS | ISO 1 |
| | 3 | 6H < x < WS | ISO 0 (~0%) | 6H < x < WS | ISO 0 (~0%) |
| | 3.5 | 6H < x < WS | ISO 0 (~0%) | 6H < x < WS | ISO 0 (~0%) |
| Plasticizer Identity | Wt % | Pencil (UW, 24 h) | Cross Hatch (UW, 24 h) | Pencil (UW, 24 h rhodB) | Cross Hatch (UW, 24 h rhodB) |
| Di-n-Octyl Phthalate | 3 | 6H < x < WS | ISO 2 | 6H < x < WS | ISO 4 |
| | 3.5 | 6H < x < WS | ISO 0 | 6H < x < WS | ISO 1 |
| | 4 | 6H < x < WS | ISO 0 | 6H < x < WS | ISO 0 |
| | 4.5 | 6H < x < WS | ISO 0 | 6H < x < WS | ISO 0 |
| Bis (2-ethylhexyl) sebacate | 1.5 | 6H < x < WS | ISO 4 | 6H < x < WS | ISO 3 |
| | 2 | 6H < x < WS | ISO 2 | 6H < x < WS | ISO 3 |
| | 3 | 6H < x < WS | ISO 1 | 6H < x < WS | ISO 1 |
| | 3.5 | 6H < x < WS | ISO 0 (~0%) | 6H < x < WS | ISO 0 (~0%) |

TABLE 9

(10% PSC in DMC, cure 100° C., o/n; Thin coat)

| Plasticizer Identity | Wt % | Pencil (dry) | Cross Hatch (dry) | Pencil (dry rhodB) | Cross Hatch (dry rhodB) |
|---|---|---|---|---|---|
| Di-n-Octyl Phthalate | 3 | 6H < x < WS | ISO 0 (~0%) | 6H < x < WS | ISO 0 (~0%) |
|  | 3.5 | 6H < x < WS | ISO 0 (~0%) | 6H < x < WS | ISO 0 (~0%) |
|  | 4 | 6H < x < WS | ISO 0 (~0%) | 6H < x < WS | ISO 0 (~0%) |
|  | 4.5 | 6H < x < WS | ISO 0 (~0%) | 6H < x < WS | ISO 0 (~0%) |
| Bis(2-ethylhexyl) sebacate | 1.5 | 6H < x < WS | ISO 0 (~0%) | 6H < x < WS | ISO 0 (~0%) |
|  | 2 | 6H < x < WS | ISO 0 (~0%) | 6H < x < WS | ISO 0 (~0%) |
|  | 3 | 6H < x < WS | ISO 0 (~0%) | 6H < x < WS | ISO 0 (~0%) |
|  | 3.5 | 6H < x < WS | ISO 0 (~0%) | 6H < x < WS | ISO 0 (~0%) |

| Plasticizer Identity | Wt % | Pencil (UW, 24 h) | Cross Hatch (UW, 24 h) | % Rust | Pencil (UW, 24 h rhodB) | Cross Hatch (UW, 24 h rhodB) |
|---|---|---|---|---|---|---|
| Di-n-Octyl Phthalate | 3 | 6H < x < WS | ISO 5 | <5 | 6H < x < WS | ISO 4 |
|  | 3.5 | 6H < x < WS | ISO 5 | <5 | 6H < x < WS | ISO 5 |
|  | 4 | 6H < x < WS | ISO 3 | <5 | 6H < x < WS | ISO 4 |
|  | 4.5 | 6H < x < WS | ISO 1 | 5 | 6H < x < WS | ISO 3 |
| Bis(2-ethylhexyl) sebacate | 1.5 | 6H < x < WS | ISO 3 | 10 | 6H < x < WS | ISO 3 |
|  | 2 | 6H < x < WS | ISO 3 | <5 | 6H < x < WS | ISO 2 |
|  | 3 | 6H < x < WS | ISO 0 (~0%) | <5 | 6H < x < WS | ISO 0 (~0%) |
|  | 3.5 | 6H < x < WS | ISO 0 (~0%) | 5 | 6H < x < WS | ISO 0 (~0%) |

Summary for Very Hydrophobic Plasticizers (10% PSC in DMC, Cured at 100° C.) Di-n-Octyl Phthalate Minimum for good adhesion is 3.5-4.0 wt %, but both thin/thick coatings have good adhesion at 5.0 wt %. Use of more than 7.5% showed cohesion failure.

Bis(2-ethylhexyl) Sebacate

Minimum for good adhesion is 2.5-3.0 wt %, but both thin/thick have good adhesion at 3.5 wt %. Use of more than 7.5% showed cohesion failure.

TABLE 10

Di-n-butyl Phthalate Comparisons 10% PSC in DMC, cure 100° C., o/n, thick coat

| Plasticizer Identity | Wt % | Pencil (dry) | Cross Hatch (dry) | Pencil (dry rhodB) | Cross Hatch (dry rhodB) |
|---|---|---|---|---|---|
| Di-n-butyl Phthalate | 2.5 | 6H < x < WS | ISO 4 | 6H < x < WS | ISO 4 |
|  | 5 | 6H < x < WS | ISO 3 | 6H < x < WS | ISO 4 |
|  | 7.5 | 6H < x < WS | ISO 2 | 6H < x < WS | ISO 3 |
|  | 10 | 6H < x < WS | ISO 1 | 6H < x < WS | ISO 1 |
|  | 12.5 | 6H < x < WS | ISO 1 | 6H < x < WS | ISO 1 |
|  | 15 | 6H < x < WS | ISO 1 | 6H < x < WS | ISO 1 |
|  | 17.5 | 6H < x < WS | ISO 1 | 6H < x < WS | ISO 1 |
|  | 20 | 6H < x < WS | ISO 1 | 6H < x < WS | ISO 1 |

| Plasticizer Identity | Wt % | Pencil (UW, 24 h) | Cross Hatch (UW, 24 h) | % Rust | Pencil (UW, 24 h rhodB) | Cross Hatch (UW, 24 h rhodB) |
|---|---|---|---|---|---|---|
| Di-n-butyl Phthalate | 2.5 | HB < x < 2H | ISO 5 | <5 | HB < x < 2H | ISO 5 |
|  | 5 | 2H < x < 4H | ISO 5 | <5 | 2H < x < 4H | ISO 5 |
|  | 7.5 | 2H < x < 4H | ISO 3 | <5 | 2H < x < 4H | ISO 3 |
|  | 10 | 6H < x < WS | ISO 3 | <5 | 6H < x < WS | ISO 4 |
|  | 12.5 | 4H < x < 6H | ISO 3 | <5 | 4H < x < 6H | ISO 4 |
|  | 15 | 2H < x < 4H | ISO 3/4 | <5 | 4H < x < 6H | ISO 3 |
|  | 17.5 | HB < x < 2H | ISO 5 | <5 | HB < x < 2H | ISO 3 |
|  | 20 | HB < x < 2H | ISO 4 | <5 | 2H < x < 4H | ISO 3 |

TABLE 11

Di-n-butyl Phthalate Comparisons 10% PSC in DMC, cure 100° C., o/n, thin coat

| Plasticizer Identity | Wt % | Pencil (dry) | Cross Hatch (dry) | Pencil (dry rhodB) | Cross Hatch (dry rhodB) |
|---|---|---|---|---|---|
| Di-n-butyl Phthalate | 2.5 | 6H < x < WS | ISO 0 | 6H < x < WS | ISO 0 |
|  | 5 | 6H < x < WS | ISO 0 | 6H < x < WS | ISO 0 |

TABLE 11-continued

Di-n-butyl Phthalate Comparisons 10% PSC in DMC, cure 100° C., o/n, thin coat

|  | 7.5 | 6H < x < WS | ISO 0 | 6H < x < WS | ISO 0 |
|---|---|---|---|---|---|
|  | 10 | 6H < x < WS | ISO 0 | 6H < x < WS | ISO 0 |
|  | 12.5 | 6H < x < WS | ISO 0 | 6H < x < WS | ISO 0 |
|  | 15 | 6H < x < WS | ISO 0 | 6H < x < WS | ISO 0 |
|  | 17.5 | 6H < x < WS | ISO 0 | 6H < x < WS | ISO 0 |
|  | 20 | 6H < x < WS | ISO 0 | 6H < x < WS | ISO 0 |

| Plasticizer Identity | Wt % | Pencil (UW, 24 h) | Cross Hatch (UW, 24 h) | Pencil (UW, 24 h rhodB) | Cross Hatch (UW, 24 h rhodB) |
|---|---|---|---|---|---|
| Di-n-butyl Phthalate | 2.5 | 2H < x < 4H | ISO 4 | 2H < x < 4H | ISO 5 |
|  | 5 | 2H < x < 4H | ISO 3 | 2H < x < 4H | ISO 5 |
|  | 7.5 | 4H < x < 6H | ISO 5 | 4H < x < 6H | ISO 5 |
|  | 10 | 6H < x < WS | ISO 5 | 6H < x < WS | ISO 3 |
|  | 12.5 | 4H < x < 6H | ISO 5 | 2H < x < 4H | ISO 5 |
|  | 15 | HB < x < 2H | ISO 5 | HB < x < 2H | ISO 5 |
|  | 17.5 | 2H < x < 4H | ISO 5 | HB < x < 2H | ISO 5 |
|  | 20 | HB < x < 2H | ISO 5 | 2H < x < 4H | ISO 5 |

TABLE 12

Dibutyl Sebacate Comparisons 10% PSC in DMC, cure 100° C., o/n thick coat

| Plasticizer Identity | Wt % | Pencil (dry) | Cross Hatch (dry) | Pencil (dry rhodB) | Cross Hatch (dry rhodB) |
|---|---|---|---|---|---|
| Di-n-butyl Sebacate | 2.5 | 6H < x < WS | ISO 4 | 6H < x < WS | ISO 4 |
|  | 5 | 6H < x < WS | ISO 4 | 6H < x < WS | ISO 3 |
|  | 7.5 | 6H < x < WS | ISO 3 | 6H < x < WS | ISO 2 |
|  | 10 | 6H < x < WS | ISO 1 | 6H < x < WS | ISO 0 |
|  | 12.5 | 6H < x < WS | ISO 0 | 6H < x < WS | ISO 0 |
|  | 15 | 6H < x < WS | ISO 0 | 6H < x < WS | ISO 0 |
|  | 17.5 | Coh fail. | Coh fail. | Coh fail. | Coh fail. |
|  | 20 | Coh fail. | Coh fail. | Coh fail. | Coh fail. |

| Plasticizer Identity | Wt % | Pencil (UW, 24 h) | Cross Hatch (UW, 24 h) | % Rust | Pencil (UW, 24 h rhodB) | Cross Hatch (UW, 24 h rhodB) |
|---|---|---|---|---|---|---|
| Di-n-butyl Sebacate | 2.5 | 2H < x < 4H | ISO 5 | <5 | 2H < x < 4H | ISO 5 |
|  | 5 | 2H < x < 4H | ISO 5 | <5 | 2H < x < 4H | ISO 5 |
|  | 7.5 | 6H < x < WS | ISO 4 | <5 | 4H < x < 6H | ISO 4 |
|  | 10 | 6H < x < WS | ISO 0 | <5 | 6H < x < WS | ISO 3 |
|  | 12.5 | 6H < x < WS | ISO 0 | <5 | 6H < x < WS | ISO 0 |
|  | 15 | 6H < x < WS | ISO 0 | <5 | 6H < x < WS | ISO 0 |
|  | 17.5 | Coh fail. | Coh fail. | <5 | Coh fail. | Coh fail. |
|  | 20 | Coh fail. | Coh fail. | <5 | Coh fail. | Coh fail. |

TABLE 13

Dibutyl Sebacate Comparisons (10% PSC in DMC, cure 100° C., o/n thin coat)

| Plasticizer Identity | Wt % | Pencil (dry) | Cross Hatch (dry) | Pencil (dry rhodB) | Cross Hatch (dry rhodB) |
|---|---|---|---|---|---|
| Di-n-butyl Sebacate | 2.5 | 6H < x < WS | ISO 0 | 6H < x < WS | ISO 0 |
|  | 5 | 6H < x < WS | ISO 0 | 6H < x < WS | ISO 0 |
|  | 7.5 | 6H < x < WS | ISO 0 | 6H < x < WS | ISO 0 |
|  | 10 | 6H < x < WS | ISO 0 | 6H < x < WS | ISO 0 |
|  | 12.5 | 6H < x < WS | ISO 0 | 6H < x < WS | ISO 0 |
|  | 15 | 6H < x < WS | ISO 0 | 6H < x < WS | ISO 0 |
|  | 17.5 | 6H < x < WS | ISO 0 | 6H < x < WS | ISO 0 |
|  | 20 | 6H < x < WS | ISO 0 | 6H < x < WS | ISO 0 |

TABLE 13-continued

Dibutyl Sebacate Comparisons (10% PSC in DMC, cure 100° C., o/n thin coat)

| Plasticizer Identity | Wt % | Pencil (UW, 24 h) | Cross Hatch (UW, 24 h) | Pencil (UW, 24 h rhodB) | Cross Hatch (UW, 24 h rhodB) |
|---|---|---|---|---|---|
| Di-n-butyl Sebacate | 2.5 | 2H < x < 4H | ISO 4 | 2H < x < 4H | ISO 5 |
| | 5 | 2H < x < 4H | ISO 5 | 2H < x < 4H | ISO 5 |
| | 7.5 | 2H < x < 4H | ISO 4 | 2H < x < 4H | ISO 4 |
| | 10 | 2H < x < 4H | ISO 4 | 2H < x < 4H | ISO 4 |
| | 12.5 | HB < x < 2H | ISO 4 | HB < x < 2H | ISO 5 |
| | 15 | 6H < x < WS | ISO 3 | 6H < x < WS | ISO 4 |
| | 17.5 | 6H < x < WS | ISO 5 | HB < x < 2H | ISO 5 |
| | 20 | Coh fail. | Coh fail. | Coh fail. | Coh fail. |

TABLE 14

Optimizing Dibutyl Sebacate Comparisons, 10% PSC in DMC, cure 100° C., o/n Thick coat)

| Plasticizer Identity | Wt % | Pencil (dry) | Cross Hatch (dry) | Pencil (dry rhodB) | Cross Hatch (dry rhodB) |
|---|---|---|---|---|---|
| Di-n-butyl Sebacate | 11 | 6H < x < WS | ISO 1 | 6H < x < WS | ISO 1 |
| | 12 | 6H < x < WS | ISO 1 | 6H < x < WS | ISO 1 |
| | 13 | 6H < x < WS | ISO 0 | 6H < x < WS | ISO 0 |
| | 14 | 6H < x < WS | ISO 0 | 6H < x < WS | Coh. fail. |

| Plasticizer Identity | Wt % | Pencil (UW, 24 h) | Cross Hatch (UW, 24 h) | % Rust | Pencil (UW, 24 h rhodB) | Cross Hatch (UW, 24 h rhodB) |
|---|---|---|---|---|---|---|
| Di-n-butyl Sebacate | 11 | 4H < x < 6H | ISO 3 | <5 | 4H < x < 6H | ISO 2 |
| | 12 | 2H < x < 4H | ISO 0 | <5 | HB < x < 2H | ISO 0 |
| | 13 | 2H < x < 4H | ISO 0 | <5 | 2H < x < 4H | ISO 0 |
| | 14 | HB < x < 2H | ISO 1 (coh fail) | <5 | Coh. Fail. | Coh. Fail. |

TABLE 15

Optimizing Dibutyl Sebacate Comparisons (10% PSC in DMC, cure 100° C., o/n Thin coat)

| Plasticizer Identity | Wt % | Pencil (dry) | Cross Hatch (dry) | Pencil (dry rhodB) | Cross Hatch (dry rhodB) |
|---|---|---|---|---|---|
| Di-n-butyl Sebacate | 11 | 6H < x < WS | ISO 0 | 6H < x < WS | ISO 0 |
| | 12 | 6H < x < WS | ISO 0 | 6H < x < WS | ISO 0 |
| | 13 | 6H < x < WS | ISO 0 | 6H < x < WS | ISO 0 |
| | 14 | 6H < x < WS | ISO 0 | 6H < x < WS | ISO 0 |
| | 11 | 6H < x < WS | ISO 0 | 6H < x < WS | ISO 0 |
| | 12 | 6H < x < WS | ISO 0 | 6H < x < WS | ISO 0 |
| | 13 | 6H < x < WS | ISO 0 | 6H < x < WS | ISO 0 |
| | 14 | 6H < x < WS | ISO 0 | 6H < x < WS | ISO 0 |

Summary for Dibutyl Plasticizers

Di-n-butyl phthalate (0-20 wt %), poor adhesion to substrate following submersion Dibutyl sebacate (0-20 wt %), minimum for good adhesion about 10 wt %, thin coats generally had poor adhesion following submersion. About 12.5-13 wt % may be optimum. It was noted that coatings developed spots at 14 wt %. Cohesion failure was noted for coatings having wt % greater than 15%.

Coatings Applied to Abraded Surfaces.

A series of five test strips were prepared using abraded carbon steel with a thick coating that was cured at 100° C. over night (o/n).

S1—10% PSC, exposed edges
S2—10% PSC, caulked edges
S3—10% PSC, 5% di-n-octyl phthalate, caulked edges
S4—10% PSC, 4% bis(2-ethylhexyl) sebacate (BEHS), caulked edges
S5—10% PSC, 13% dibutyl sebacate, caulked edges The test strips were placed in the usual salt solution on day 1, removed for day 2, resubmerged on day 3, removed for day 4, resubmerged on day 5, removed for day 6, resubmerged on day 7, and removed on day 8. See TABLES 16a-16f

TABLE 16a

| | S1 | S2 | S3 | S4 | S5 |
|---|---|---|---|---|---|
| Day 2 | <5% rust | <5% rust | <5% rust | <5% rust | <5% rust |
| Day 4 | <5% rust | <5% rust | 5% rust | 5% rust | <5% rust |
| Day 6 | 5% rust | 5% rust | 5% rust | 5% rust | 5% rust |
| Day 8 | 5% rust | 5% rust | 5% rust | 5% rust | 5% rust |
| Day 12 | — | — | 5% rust | 5% rust | 5% rust |
| Day 14 | — | — | 5% rust | 5% rust | 5% rust |

TABLE 16b

| | Day | Pencil (dry) | Cross Hatch (dry) |
|---|---|---|---|
| S1 | 2 | 1B | ISO 5 |
| | 4 | 2B | ISO 5 |
| | 6 | 2B | ISO 5 |
| | 8 | 5B/6B | ISO 5 |

TABLE 16c

| | Day | Pencil (dry) | Cross Hatch (dry) |
|---|---|---|---|
| S2 | 2 | 4B | ISO 5 |
| | 4 | 2B | ISO 5 |
| | 6 | 4B | ISO 5 |
| | 8 | 5B | ISO 5 |

TABLE 16d

| | Day | Pencil (dry) | Cross Hatch (dry) |
|---|---|---|---|
| S3 | 2 | — | ISO 0 |
| | 4 | — | ISO 1 |
| | 6 | — | ISO 1/2 |
| | 8 | — | ISO 1/2 |

TABLE 16e

| | Day | Pencil (dry) | Cross Hatch (dry) |
|---|---|---|---|
| S4 | 2 | — | ISO 0 |
| | 4 | — | ISO 0 |
| | 6 | — | ISO 0 |
| | 8 | — | ISO 0 |

TABLE 16f

| | Day | Pencil (dry) | Cross Hatch (dry) |
|---|---|---|---|
| S5 | 2 | — | ISO 1 |
| | 4 | — | ISO 0 |
| | 6 | — | ISO 0 |
| | 8 | — | ISO 0 |

TABLE 17

Propylene carbonate (PC), 10% PSC with x wt % of di-n-octyl phthalate, (cure 100° C., o/n Thin coat)

| Plasticizer Identity | Wt % | Cross Hatch (UW, 24 h) | Avg. % Rust |
|---|---|---|---|
| Di-n-octyl phthalate | 2 | ISO 1 | ~5 |
| | 3 | ISO 0 | ~5 |
| | 4 | ISO 0 | ~5 |
| | 5 | ISO 0 | ~10 |
| | 6 | ISO 0 | ~5 |
| | 7 | ISO 0 | ~5 |

Adhesion Measurements

Solutions of poly(styrene-co-catechol) in dimethyl carbonate (DMC) at varying weight percent (5-15 wt % in DMC, or 5.6-18.8% solution in DMC (g/mL)) were made in 20 mL vials that were alternatively vortexed and placed at 43 C for a few minutes each, until the poly(styrene-co-catechol) had fully solubilized in the DMC. Meanwhile, the surfaces of 2×2×0.03 in. mild carbon-steel square sheets were cleaned with acetone and subsequently abraded with 60-grit sandpaper in a circular fashion. These surfaces were once again cleaned with acetone to remove any particulate residue from the mild carbon steel surface. Using a syringe, 2 mL of solution was added to the surface of the square sheet metal before being spread using the 250 um side of a 4-sided paint coating applicator. This was repeated twice (n=3). The samples were left to dry at room temperature for at least 1 hour before being placed at 100 C overnight (1 nominal day). The samples were then removed the next day and placed at room temperature to cool for at least 1 hour. Then, the surfaces of the dry coating were gently abraded with a porous surface (supplied by Defelsko Instruments) and cleaned with a Q-tip dipped in isopropanol. The surfaces of aluminum dollies (20 mm, supplied by Defelsko Instruments) were abraded with the porous surface and wiped with a paper towel. Then, equal parts of an epoxy adhesive (supplied by Defelsko Instruments) were mixed in a weigh boat before being applied to the bottom of the abraded aluminum dollies. The dollies were then placed on the cleaned and gently abraded coating, and the dollies were firmly pressed against the coating to remove excess epoxy and air bubbles. The excess was removed with a cotton swab. These samples were left to cure at room temperature for approximately 24 hours. The next day, using the Defelsko PosiTest AT-A Automatic Adhesion Pull-Off Tester (under default settings), pull-off adhesion strengths values were determined. See TABLE 18.

TABLE 18

| Wt % PSC (in DMC) | % soln. PSC (in DMC) | Adhesion Strength (MPa) (n = 3) |
|---|---|---|
| 5 | 5.6 | 0.65 ± 0.31 |
| 6 | 6.8 | 0.61 ± 0.1 |
| 7 | 8.1 | 0.43 ± 0.13 |

TABLE 18-continued

| Wt % PSC (in DMC) | % soln. PSC (in DMC) | Adhesion Strength (MPa) (n = 3) |
|---|---|---|
| 8 | 9.3 | 0.49 ± 0.08 |
| 9 | 10.6 | 0.41 ± 0.19 |
| 10 | 11.8 | 0.31 ± 0.04 |
| 11 | 13.2 | 0.34 ± 0.02 |
| 12 | 14.6 | 0.24 ± 0.08 |
| 13 | 16 | 0.26 ± 0.04 |
| 14 | 17.4 | 0.27 ± 0.03 |
| 15 | 18.8 | N/A |

Using the general approach shown in the preceding example, the effect of adding a plasticizer was measured.

Coatings were prepared using 8.5% or 10 wt % PSC in DCM with or without 4 wt % BEHS on mild steel strips. Coating thickness and adhesion strength are shown in TABLE 18 ("a" indicates adhesion failure, "c" indicates cohesion failure).

| Composition (wt % PSC/wt % BEHS) | Coating Thickness (in MIL) | Pull-off Adhesion (Mpa) |
|---|---|---|
| 8.5/0 | 2.4 ± 0.16 MIL (n = 33) | 0.500 ± 0.056 MPa (n = 3) a |
| 10/0 | 2.3 ± 0.37 MIL (n = 34) | 0.603 ± 0.038 MPa (n = 3) a |
| 8.5/4 | 2.3 ± 0.2 MIL (n = 33) | 1.49 ± 0.092 MPa (n = 3) c |
| 10/4 | 2.86 ± 0.22 MIL (n = 32) | 2.20 ± 0.188 MPa (n = 3) c |

REFERENCES (1) In Corrosion. Understanding the Basics; Davis, J. R., Ed.; ASM International: Materials Park, OH, 2000, p 1-20.
(2) Meredith, H. J.; Jenkins, C. L.; Wilker, J. J. "Enhancing the Adhesion of a Biomimetic Polymer Yields Performance Rivaling Commercial Glues" Adv. Funct. Materials 2014, 24, 3259-3267.
(3) North, M. A.; Grosso, C. A. D.; Wilker, J. J. "High Strength Underwater Bonding with Polymer Mimics of Mussel Adhesive Proteins" ACS Appl. Mater. Interface. 2017, 9, 7866-7872. sion.

The entirety of the contents of all documents cited herein are incorporated by reference.

What is claimed:

1. A process for inhibiting corrosion of a metal object, the process comprising the steps of contacting the surface of the object with a solution comprising a copolymer of 3,4-dihydroxy styrene and styrene to yield a first coating; and curing by air drying the first coating to yield a second coating, where one side of the second coating is adhered to the surface of the object and the other side of the second coating is exposed to the object's environment; wherein the weight percent (wt %) of 3,4-dihydroxy styrene in the co-polymer is from about 20 wt % to about 35 wt %.

2. The process of claim 1, wherein the wt % of 3,4-dihydroxy styrene in the co-polymer is from about 20 wt % to about 30 wt %.

3. The process of claim 1, wherein the wt % of 3,4-dihydroxy styrene in the co-polymer is from about 24 wt % to about 26 wt %.

4. The process of claim 1 wherein the solution comprises one or more solvents selected from the group consisting of acetone, 2-butanone, tetrahydrofuran (THF), 2-methyl-tetrahydrofuran (2-Me-THF), dimethyl carbonate (DMC), ethyl lactate, ethyl acetate, n-butyl acetate, and propylene carbonate (PC).

5. The process of claim 4, wherein the solution further comprises a plasticizer, wherein the wt % of the plasticizer is from about 1 wt % to about 20 wt %.

6. The process of claim 5, wherein the plasticizer is di-n-octyl phthalate or bis(2-ethylhexyl) sebacate.

7. The process of claim 6, wherein the plasticizer is about 2.5 wt % bis(2-ethylhexyl) sebacate.

8. The process of claim 6, wherein the plasticizer is about 5.0 wt % of di-n-octyl phthalate.

9. The process of claim 1 wherein the solution further comprises a plasticizer, wherein the wt % of the plasticizer relative to the copolymer is from about 1 wt % to about 20 wt %.

10. The process of claim 9, wherein the plasticizer is selected from the group consisting of di-alkylphthalates, tri-alkyl-O-acyl citrates, and di-alkylsebacates.

11. The process of claim 10, wherein the plasticizer is di-n-octyl phthalate or bis(2-ethylhexyl) sebacate.

12. The process of claim 11, wherein the plasticizer is about 2.5 wt % bis(2-ethylhexyl) sebacate.

13. The process of claim 11, wherein the plasticizer is about 5.0 wt % of di-n-octyl phthalate.

14. The process of claim 1, wherein the second coating has one or more of the following characteristics:
    (a) a thickness from about 0.5 mil to about 3.5 mil;
    (b) a pencil hardness of greater than 5H; and
    (c) a cross-hatch test value of ISO 0.

15. The process of claim 14, wherein the object has less than 5% corrosion after being immersed in a 3.9% saltwater solution for 24 hours.

16. The process of claim 1, wherein the metal is selected from the group consisting of iron, steel, aluminum, zinc, bronze, brass, titanium, magnesium, tin, cobalt, tungsten, nickel, and copper.

17. The process of claim 1, wherein the metal is steel.

18. The process of claim 1, wherein curing occurs at 20° C. to 150° C.

19. The process of claim 1, wherein curing takes from 1 to 24 hours.

* * * * *